(12) United States Patent
Kodama et al.

(10) Patent No.: US 6,644,812 B2
(45) Date of Patent: Nov. 11, 2003

(54) DISPLAY APPARATUS AND PROJECTION TYPE DISPLAY APPARATUS

(75) Inventors: Hiroyuki Kodama, Tochigi-ken (JP); Atsushi Okuyama, Saitama-ken (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 09/826,328

(22) Filed: Apr. 4, 2001

(65) Prior Publication Data

US 2001/0055096 A1 Dec. 27, 2001

(30) Foreign Application Priority Data

Apr. 4, 2000 (JP) ........................................ 2000-102502

(51) Int. Cl.[7] ........................ G03B 21/00; G03B 21/26; G03B 21/28; G03B 21/14; G02F 1/1335
(52) U.S. Cl. .............................. 353/31; 353/33; 353/34; 353/37; 353/84; 349/8
(58) Field of Search .............................. 353/31, 33, 34, 353/37, 84; 349/5, 8

(56) References Cited

U.S. PATENT DOCUMENTS 3,836,243 A * 9/1974 Melchior .................... 353/122
5,555,035 A * 9/1996 Mead et al. ................. 348/757
6,000,802 A * 12/1999 Hashizume et al. .......... 353/38
6,559,901 B2 * 5/2003 Yamamoto et al. ............ 349/5

* cited by examiner

Primary Examiner—Russell Adams
Assistant Examiner—Magda Cruz
(74) Attorney, Agent, or Firm—Morgan & Finnegan

(57) ABSTRACT

The present invention provides a display apparatus which can prevent the unevenness of the quantity of light in case of display giving priority to color reproducibility and can also correct the unevenness of the up rate to the brightness in display attaching importance to color reproducibility in case of display giving priority to brightness. In the display apparatus, light from a light source 1 is separated into three colors R, G and B by dichroic mirrors DM1, DM2, and liquid crystal display elements 8R, 8G and 8B corresponding to the color-separated three colors are illuminated with these lights, and the three color lights are modulated by these display elements to thereby form a color image, and the dichroic mirrors DM1 and DM2 include a dichroic mirror DM1 subjected to inclination correction movable in its inclined direction.

31 Claims, 21 Drawing Sheets

THIRD OPTICAL ELEMENT

DM1

DM2

CASE WITH THIRD OPTICAL ELEMENT INSERTED

CASE WITH THIRD OPTICAL ELEMENT NOT INSERTED

CASE WITH THIRD OPTICAL ELEMENT INSERTED

CASE WITH THIRD OPTICAL ELEMENT NOT INSERTED

CASE WITH THIRD OPTICAL ELEMENT INSERTED

CASE WITH THIRD OPTICAL ELEMENT NOT INSERTED

THIRD OPTICAL ELEMENT

DM1

DM2

CASE WITH THIRD OPTICAL ELEMENT INSERTED

CASE WITH THIRD OPTICAL ELEMENT NOT INSERTED

CASE WITH THIRD OPTICAL ELEMENT INSERTED

CASE WITH THIRD OPTICAL ELEMENT NOT INSERTED

THIRD OPTICAL ELEMENT

DM1

DM2

THIRD OPTICAL ELEMENT

DM1

DM2

DM1

DM2

TR

TG

DISPLAY APPARATUS AND PROJECTION TYPE DISPLAY APPARATUS

BACKGROUND OF THE INVENTION

1. Field of the Invention

This invention relates to a display apparatus, for example, a projection type display apparatus used to display a computer image or a video image on a large screen.

2. Related Background Art

In recent years, the use of display apparatus has been diversified in the field of image processing or the like and therefore, there have been required display apparatuses in which optimum color purity, color balance, illuminance, etc. are obtained in accordance with the use.

FIG. 24 of the accompanying drawings show the construction of a projection type display apparatus according to the prior art. In FIG. 24, white light emitted from a light source portion 1 passes through fly-eye lenses 3, 4, a PS conversion element 5, a condenser lens 6, etc., whereafter the light in the red band is transmitted through a dichroic mirror DM1 and the lights in the green to blue bands are reflected by the dichroic mirror DM1. Generally, as the light source, use is made of a halogen lamp, a metal halide lamp, a super-high pressure mercury lamp or the like, and as a color separating and combining optical element, use is made of a dichroic mirror, a dichroic prism or the like.

The red band light transmitted through the dichroic mirror DM1 exhibiting the spectral transmittance shown in FIG. 25A of the accompanying drawings has its optical path changed by 90° by a total reflection mirror M1, and enters a liquid crystal display element 8R through a field lens 7R and a trimming filter TR exhibiting the spectral transmittance shown in FIG. 25C of the accompanying drawings, and is light-modulated there in conformity with an input signal. The light-modulated light enters a dichroic prism 9, and has its optical path changed by 90° by the dichroic prism 9 and enters a projection lens 10.

On the other hand, the green-blue band light reflected by the dichroic mirror DM1 and having had its optical path by 90° enters a dichroic mirror DM2 exhibiting the spectral transmittance shown in FIG. 25B of the accompanying drawings. From FIG. 25B, the dichroic mirror DM2 has the characteristic of reflecting the green band light and therefore, the green band light is reflected there and has its optical path changed by 90°, and enters a liquid crystal display element 8G through a field lens 7G and a trimming filter TG exhibiting the spectral transmittance shown in FIG. 25D of the accompanying drawings, and is light-modulated there in conformity with the input signal. The light-modulated green band light enters the dichroic prism 9 and the projection lens 10 in the named order.

The blue band light transmitted through the dichroic mirror DM2 enters a liquid crystal display element 8B through the intermediary of a condenser lens 11, relay lens 12, field lens 7B and total reflection mirrors M2 and M3, and is light-modulated there in conformity with the input signal. The light-modulated blue band light enters the dichroic prism 9, and has its optical path changed by 90° by the dichroic prism 9 and enters the projection lens. In the prior-art projection type display apparatus constructed as described above, when the contrast of each liquid crystal display element is sufficiently high, the color purity of the red band light is determined by the spectral characteristic of the source light and the spectral transmittances of the dichroic mirror DM1 and the trimming filter TR, the color purity of the green band light is determined by the spectral characteristic of the source light and the spectral transmittances of the dichroic mirror DM1, DM2 and the trimming filter TG, and the color purity of the blue band light is determined by the spectral characteristic of the source light and the spectral transmittances of the dichroic mirrors DM1 and DM2.

As described above, in the construction of the prior-art projection type display apparatus, the design of each optical element has been made such that optimum color balance and color purity are obtained.

However, depending on the use of the projection type display apparatus, there are various requirements such as a case where bright display is required even if the apparatus becomes bulky, a case where bright display is required even if color purity is reduced, and a case where color purity is unnecessary in a black-and-white mode.

In the conventional projection type display apparatuses, in order to enhance color purity, a light having a wavelength of 570 nm–600 nm has been cut to thereby obtain optimum color balance and color purity, but in the case of many lamps, the peak exists in the vicinity of 580 nm in terms of spectral distribution. When a wavelength in the vicinity of this is used, it becomes possible to improve illuminance.

As such an example, mention may be made of a projection type display apparatus described in Japanese Patent Application Laid-Open No. 7-072450. In the description of this publication, there is proposed a projection type display apparatus having in an optical path optical elements differing in spectral characteristic, and provided with a mechanism for retractably inserting the optical elements. Thereby, display giving priority to brightness or display giving priority to color reproducibility can be realized by an apparatus, but when the optical elements are inserted to thereby effect the display giving priority to color reproducibility, the light in the entire wavelength range or the two-color wavelength range is transmitted through the optical elements, and since the optical elements are band cut filters, the transmittance of the wavelength necessary for projection is low, and this has led to the problem that the display becomes darker than necessary.

In order to solve this problem, Japanese Patent Application No. 1-235479 is mentioned as an example in which a moving third optical element is disposed at a place where only the red or green wavelength range is transmitted and an edge filter is used as the optical element, whereby the transmittance of the wavelength necessary for projection is high and the reduction in the quantity of light during the display giving priority to color reproducibility is made as small as possible, but in this case, there arises the problem that the brightness and color taste when priority is given to color reproducibility are changed by the unevenness of the cut wavelength in the manufacture of a dichroic mirror for dividing the light into the red band light and the green band light. At the same time, there has also arisen the problem that with the unevenness of the brightness of the display giving priority to color reproducibility, the up rate of brightness of the case where priority is given to brightness to the case where priority is given to color reproducibility becomes uneven.

Describing this in detail, assuming that the brightness of the lamp itself is not uneven, the absolute value of the brightness in the case of the display giving priority to brightness is constant because the spectral distribution of the lamp is intactly utilized. However, as regards the brightness when priority is given to color reproducibility, light of 570 nm–600 nm cut to enhance the color purity thereof is changed to e.g. 565 nm–600 nm or 575 nm–600 nm by the unevenness of the cut wavelength in the manufacture of the dichroic mirror and therefore, the brightness and color taste in the case of the display giving priority to color reproducibility become uneven. Along therewith, the up rate of brightness of the case where priority is given to brightness to the case where priority is given to color reproducibility becomes uneven.

Japanese Patent Application Laid-Open No. 7-318883 and Japanese Patent Application Laid-Open No. 9-211449 may be mentioned as examples in which the unevenness of brightness and color taste due to such unevenness of the cut wavelength in the production of the dichroic mirror is restrained by the use of a dichroic mirror subjected to inclination correction moving in a direction parallel to a direction in which the dichroic mirror is inclined with respect to an optical axis. In both of these publications, it is a feature that a dichroic mirror subjected to inclination correction is provided in a color combining system, and the dichroic mirror is moved in a direction parallel to the direction in which the dichroic mirror is inclined with respect to the optical axis to thereby approximate the cut wavelength for an on-axis ray to the design value and restrain the unevenness of brightness.

In Japanese Patent Application Laid-Open No. 9-211449, an inclination correction is made to a dichroic mirror for combining the red wavelength band and the green wavelength band, and provision is made of means for moving the dichroic mirror in a direction parallel to the direction in which the dichroic mirror is inclined with respect to the optical axis, and in this correction, to effect the adjustment of color reproducibility and the adjustment of the luminance of a screen, such a light utilizing method that for example, 585 nm or less is the green wavelength band and a wavelength longer than that is the red wavelength band is most efficient.

By doing so, the adjustment width is widened in such a manner that for example, the adjustment of the red wavelength range is possible up to 585 nm–615 nm, and this is very efficient. However, considering color purity, lights of 570 nm–600 nm are lights reducing the purity of green and red, and that wavelength band must be used and this is not preferable.

Also, in order to increase color purity, use can be made of a dichroic filter or the like for cutting the lights of 570 nm–600 nm in color combination, but this is a band cut filter, and this leads to the problem that the transmittance of the wavelength necessary for projection is low and the screen becomes darker than necessary.

As another method of increasing color purity, there is conceivable a method of installing a dichroic filter or the like for each color before effecting color combination, but according to this method, the adjustment width of color reproducibility and screen luminance becomes small, and this is not preferable.

Color purity can also be increased by a method of using lights of 570 nm–600 nm until it is color-combined with only one of the red wavelength range and the green wavelength range, and putting the light of that wavelength range out of the optical path by a dichroic mirror for effecting color combination, but according to this method, the adjustment of color reproducibility and screen luminance can be effected only in a single color, and this is not preferable.

Such an example is described in Japanese Patent Application Laid-Open No. 7-318883. According to this, an inclination correction is made to a dichroic mirror for combining the red wavelength band and the green wavelength band, and provision is made of means for moving the dichroic mirror in a direction parallel to a direction in which the dichroic mirror is inclined with respect to an optical axis. This dichroic mirror follows a correcting method which corrects only the red wavelength band which is transmitted light and does not affect the green wavelength band which is reflected light, and effects the color correction of the red wavelength band as an embodiment. In this case, color purity is increased, but the number of colors corrected is limited to one, and this is not preferable.

When as described above, the dichroic mirror subjected to inclination correction and movable in a direction parallel to the direction in which the dichroic mirror is inclined with respect to the optical axis is provided in a color combining system, if design is made such that both of red and green can be corrected, there results the problem that color purity is reduced. Also, if an attempt is made to increase color purity, there will arise the problems that the transmittance of the wavelength necessary for projection is low and the screen becomes darker than necessary and that the adjustment width of color reproducibility and screen luminance becomes small, and an attempt to solve these problems would lead to the problem that the number of colors corrected is limited to one.

SUMMARY OF THE INVENTION

So, the present invention has as its object to provide a display apparatus which can solve the above-noted problems.

To achieve the above object, the display apparatus of the present invention is a display apparatus comprising:

a color separating optical system for separating light from a light source into a plurality of lights differing in color (wavelength band) from one another; and at least one display element for modulating the plurality of lights differing in color (wavelength band) from one another;

the color separating optical system including at least one color separating surface subjected to inclination correction, the color separating surface subjected to inclination correction being movable.

The color separating surface subjected to inclination correction refers to a color separating surface subjected to such correction as prevents a cut wavelength from being varied by the difference in the angle of incidence of the light onto the color separating surface.

In the above-described display apparatus, the color separating surface subjected to inclination correction is movable in a direction parallel to itself.

In the above-described display apparatus, the color separating optical system has a plurality of color separating surfaces (including a color separating surface not subjected to inclination correction).

In the above-described display apparatus, the plurality of lights differing in color from one another include at least red, green and blue lights.

In the above-described display apparatus, the color separating surface is a surface a dichroic mirror has.

In the above-described display apparatus, the display element has a light combining optical system for combining lights from a plurality of display elements disposed correspondingly to the plurality of lights differing in color from one another for modulating the plurality of lights.

In the above-described display apparatus, the light combining optical system has three or more prisms.

In the above-described display apparatus, the light combining optical system is constructed such that four prisms are cemented together by an adhesive agent and wavelength selection reflecting layers assume a substantially cruciate shape.

The above-described display apparatus has means for causing an image to be displayed in a plurality of different kinds of display forms by changing the color purity of at least one of the plurality of lights differing in color from one another.

In the above-described display apparatus, the means for causing an image to be displayed in a plurality of different kinds of display forms changes the color purity of the at least one light by putting an optical element into or out of the optical path of the at least one light color, or changing the posture of an optical element disposed in the optical path.

In the above-described display apparatus, the optical element is disposed between the color separating optical system and the display element.

In the above-described display apparatus, the optical element is an edge filter.

Also, to achieve the above object, the projection type display apparatus of the present invention is a projection type display apparatus comprising:

the above-described display apparatus; and a projection optical system for projecting the light from the at least one display element.

Also, to achieve the above object, the projection type display apparatus of the present invention is a projection type display apparatus provided with:

a plurality of image display elements;

a color separating optical system for color-separating light from a light source into a plurality of color lights;

an irradiating optical system for irradiating the plurality of image display elements with the lights from the color separating optical system;

a color combining optical system for combining the lights from the plurality of image display elements; and a projection optical system for projecting the lights combined by the color combining optical system onto a projection surface;

the projection type display apparatus having on the optical path of at least one of the plurality of color lights an optical element having the characteristic of transmitting therethrough a region of a predetermined wavelength or longer in a visible light region but blocking a region of wavelengths shorter than the predetermined wavelength, or a converse characteristic;

the color separating optical system having at least one color separating surface subjected to inclination correction, the color separating surface being movable.

In the above-described projection type display apparatus, the color separating surface subjected to inclination correction is movable in a direction parallel to itself.

In the above-described projection type display apparatus, the color separating optical system has a plurality of color separating surfaces (including a color separating surface not subjected to inclination correction).

In the above-described projection type display apparatus, the plurality of color lights include at least red, green and blue lights.

In the above-described projection type display apparatus, the color separating surface is a surface a dichroic mirror has.

In the above-described projection type display apparatus, the display elements are disposed correspondingly to respective ones of the plurality of color lights, and have a light combining optical system for combining the lights from a plurality of display elements for modulating the plurality of lights.

In the above-described projection type display apparatus, the light combining optical system has three or more prisms.

In the above-described projection type display apparatus, the light combining optical system is constructed such that four prisms are cemented together by an adhesive agent and wavelength selection reflecting layers assume a substantially cruciate shape.

The above-described projection type display apparatus has means for causing an image to be displayed in a plurality of different kinds of display forms by changing the color purity of at least one of the plurality of lights differing in color from one another.

In the above-described projection type display apparatus, the means for causing an image to be displayed in a plurality of different kinds of display forms changes the color purity of the at least one light by putting an optical element into or out of the optical path of the at least one light color, or changing the posture of an optical element disposed in the optical path.

In the above-described projection type display apparatus, the optical element is disposed between the color separating optical system and the display elements.

In the above-described projection type display apparatus, the optical element is an edge filter.

Also, to achieve the above object, the projection type display apparatus of the present invention is a projection type display apparatus comprising:

image display elements of three colors R, G and B;

a color separating optical system for color-separating light from a light source into the three colors R, G and B;

an irradiating optical system for guiding the color-resolving lights of the three colors R, G and B to the image display elements of the respective colors;

a color combining optical system for combining the lights from the plurality of image display elements; and a projection optical system for projecting the lights combined by the color combining optical system onto a projection surface;

the projection type display apparatus having in the optical path of the R color light and/or the optical path of the G color light an edge filter retractably insertable into the optical path and having the characteristic of transmitting therethrough a region of a predetermined wavelength or longer in a visible light region but blocking a region of wavelengths shorter than the predetermined wavelength, or a converse characteristic;

the color separating optical system having two dichroic mirrors, one of the two dichroic mirrors which separates a light including the R color light and a light including the G color light from each other being subjected to inclination correction, the dichroic mirror subjected to inclination correction being movable in a direction parallel to a color separating surface the dichroic mirror has.

DESCRIPTION OF THE PREFERRED EMBODIMENTS

Each embodiment of the present invention adopting the above-described construction has in an optical path a third optical element having the characteristic of transmitting therethrough the area of a certain wavelength or longer and blocking the area of wavelengths shorter than that or a converse characteristic, and the third optical element is designed to be provided with a retractably inserting mechanism, whereby display giving priority to brightness or display giving priority to color reproducibility can be realized by an apparatus, and an edge filter is used as a moving optical element, whereby the transmittance of a wavelength necessary for projection is high and it becomes possible to make the reduction in the quantity of light during the display giving priority to color reproducibility as small as possible.

Also, in each embodiment of the present invention, a dichroic mirror subjected to inclination correction movable in parallelism to an inclined direction with respect to an optical axis is used as means for separating red band light and green band light from each other, whereby it becomes possible to correct the unevenness of brightness and color state during the display giving priority to color reproducibility and at the same time, correct any change in the up rate to the brightness in the display giving priority to color reproducibility during the display giving priority to brightness.

In addition, in each embodiment of the present invention, a dichroic mirror subjected to inclination correction movable in parallelism to an inclined direction with respect to the optical axis is provided in a color resolving system, whereby even if as in the display apparatus described in Japanese Patent Application Laid-Open No. 9-211449, design is made such that the correction of a plurality of colors is effected by such a light utilizing method that 585 nm or less is the green wavelength band and wavelengths longer than that are the red wavelength band, the edge filter can be used in the course of color resolving as a dichroic filter for increasing color purity, and it becomes possible to increase color purity without the light necessary for projection becoming darker than necessary.

Some embodiments of the present invention will hereinafter be described.

(Embodiment 1)

Figure 1:
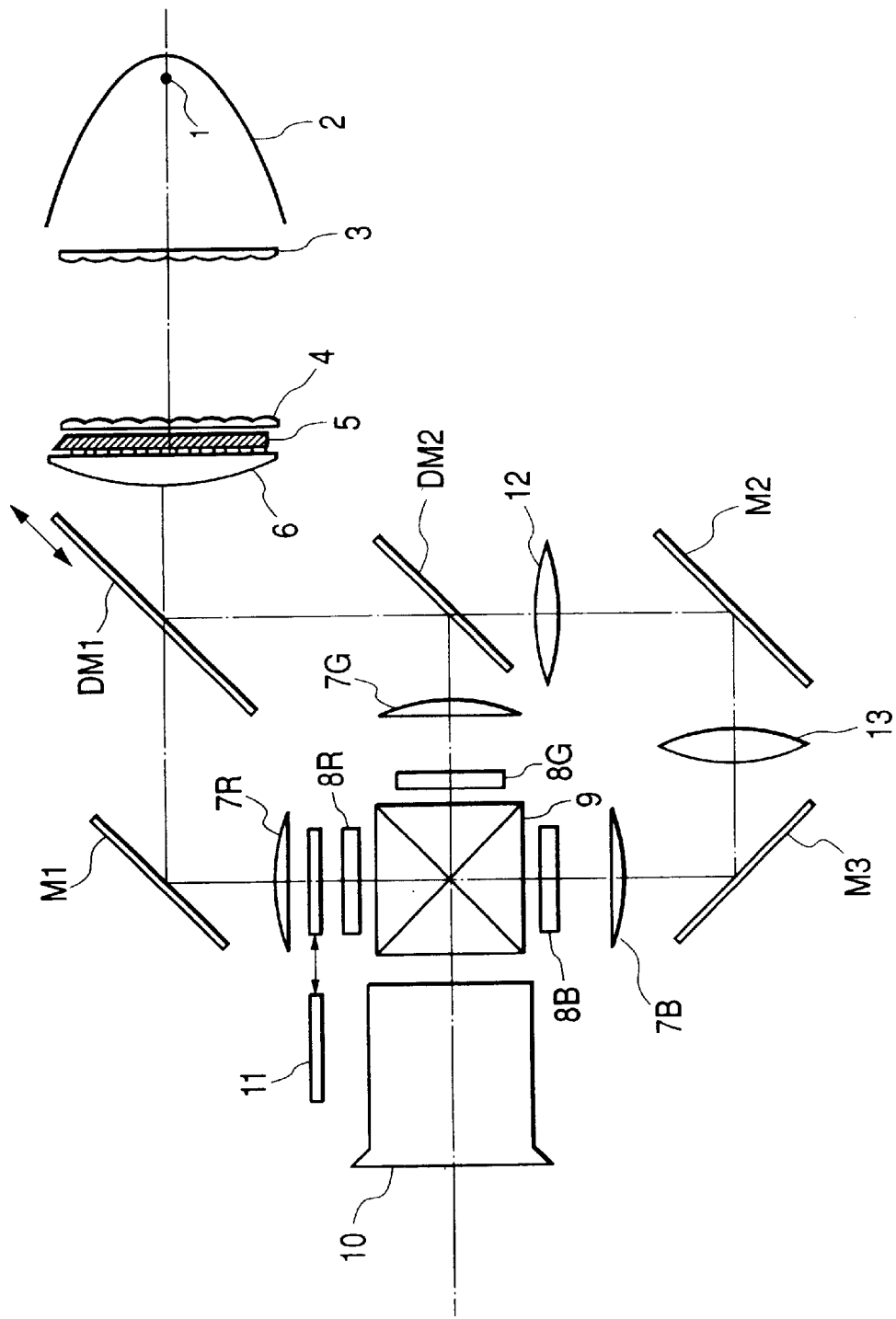
FIG. 1 shows the construction of Embodiment 1 of the present invention.
Figure 2:
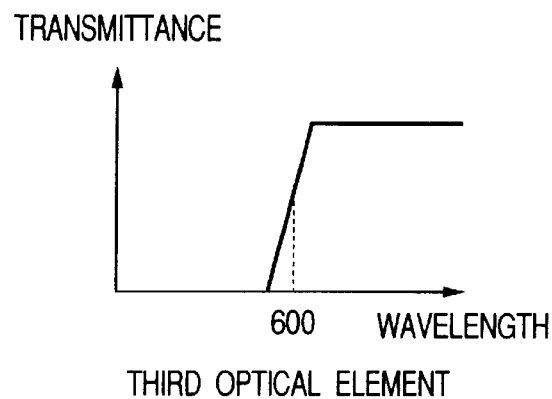
FIG. 2 shows the wavelength spectral characteristic of a third optical element in Embodiment 1 of the present invention.
Figure 3A:
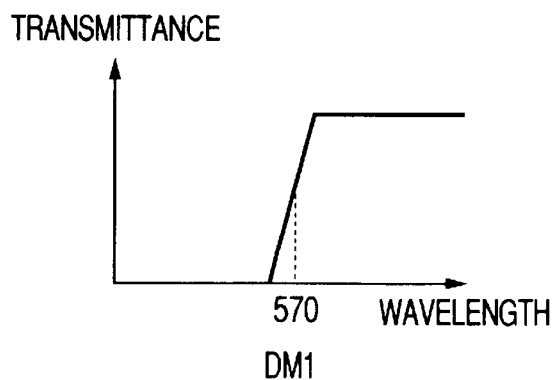
FIGS. 3A and 3B show the wavelength spectral characteristics of dichroic mirrors in Embodiment 1 of the present invention.
Figure 3B:
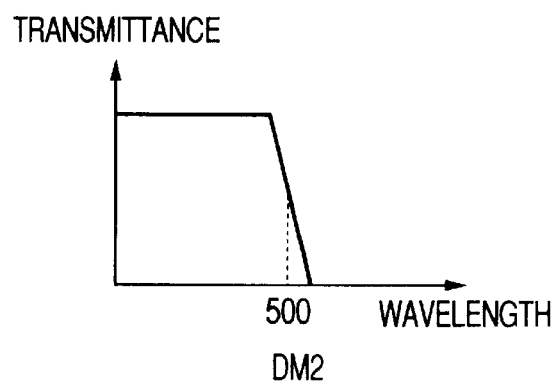

FIG. 1 shows the detailed construction of a projection type display apparatus according to Embodiment 1 of the present invention, FIG. 2 shows the spectral transmittance of a third optical element 11 retractably inserted to change color purity which is used in the present embodiment, and FIGS. 3A and 3B show the spectral transmittances of the central portions of a dichroic mirror DM1 and a dichroic mirror DM2, respectively. The third optical element is an edge filter. The third optical element may be a band cut filter.

These spectral transmittances are the design examples when a certain super-high pressure mercury lamp is used.

However, these numerical values are merely examples to the last, and are not restrictive. Various values can be set in conformity with the kind of the light source.

Red band light transmitted through the dichroic mirror DM1 exhibiting the spectral transmittance shown in FIG. 3A has its optical path changed by 90° by a total reflection mirror M1, is transmitted through the third optical element 11 when the third optical element 11 is present in the optical path through a field lens 7R, and enters a liquid crystal display element 8R. When the third optical element 11 is not present in the optical path, the light directly enters the liquid crystal display element 8R through the field lens 7R. Here the light is light-modulated in conformity with an input signal. The light-modulated light enters a dichroic prism 9, and has its optical path changed by 90° by the dichroic prism 9 and enters a projection lens 10.

On the other hand, green to blue band lights reflected by the dichroic mirror DM1 and having had its optical path changed by 90° enter the dichroic mirror DM2 exhibiting the spectral transmittance shown in FIG. 3B. From FIG. 3B, the dichroic mirror DM2 has the characteristic of reflecting green band light G and therefore, the green band light is reflected there, and has its optical path changed by 90°, and enters a liquid crystal display element 8G through a field lens 7G, and is light-modulated there in conformity with the input signal. The light-modulated green band light enters the dichroic prism 9 and the projection lens 10 in the named order.

Blue band light transmitted through the dichroic mirror DM2 enters a liquid crystal display element 8B through the intermediary of a condenser lens 12, a relay lens 13, a field lens 7B and total reflection mirrors M2, M3, and is light-modulated there in conformity with the input signal. The light-modulated blue band light enters the dichroic prism 9, and has its optical path changed by 90° by the dichroic prism 9 and enters the projection lens 10.

Here, when the third optical element 11 is not inserted in an irradiating optical path, the color purity determined by the cut wavelength of the dichroic mirrors DM1 and DM2 is lower than the color purity necessary in video display, but is bright display and is set to color purity sufficient for presentation, for example, in a company, a school or the like.

So, when high-quality display high in color purity such as video display is necessary, the third optical element 11 is inserted into the irradiating optical path. When the third optical element 11 is inserted into the irradiating optical path, band light of about 570 nm–600 nm comes not to be emitted toward the liquid crystal display element 8 side, and light of about 510 nm–570 nm is utilized as green band display light and projected light of about 600 nm or greater is utilized as red band display light.

Figure 4A:
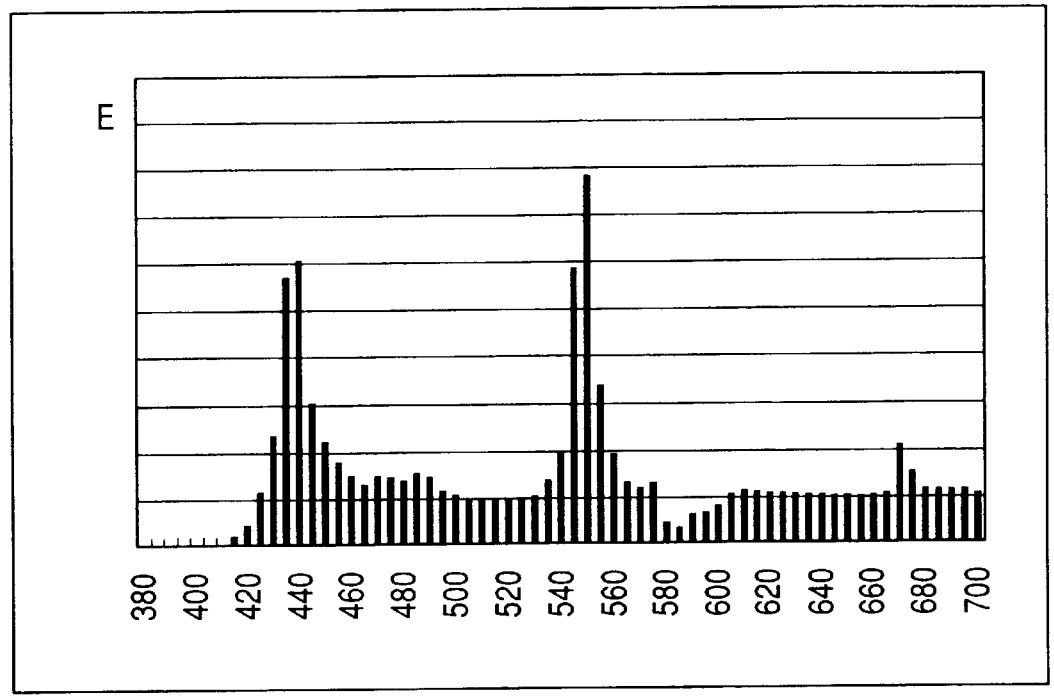
FIGS. 4A and 4B show spectral distributions when the third optical element is inserted in an optical path and when the third optical element is not inserted in the optical path, respectively.
Figure 4B:
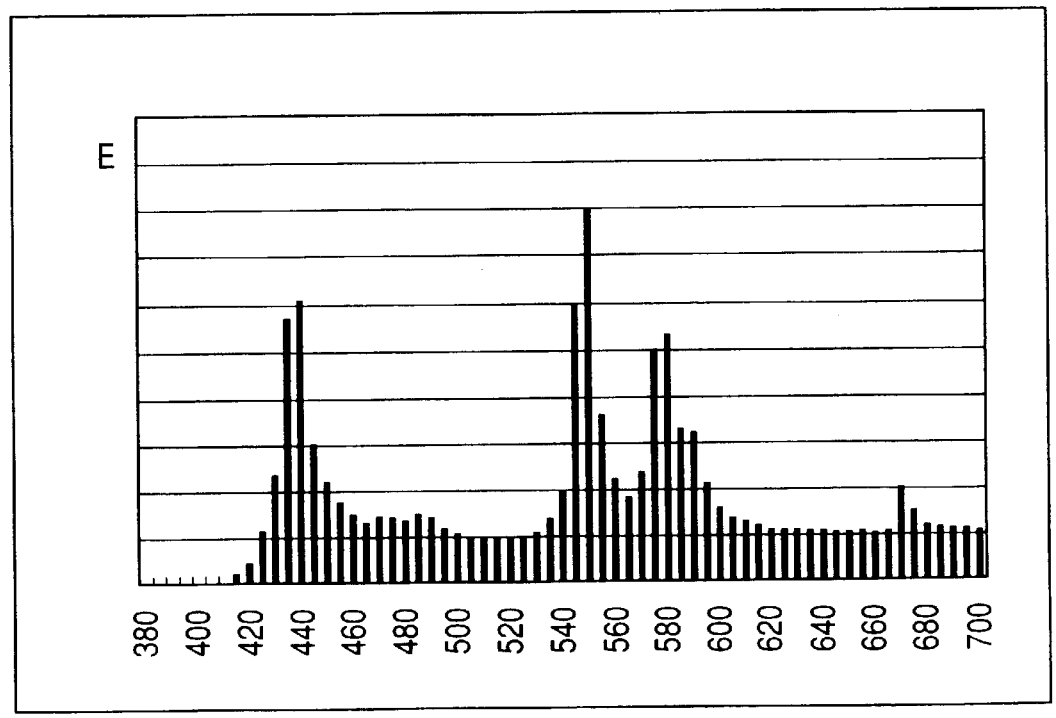

FIGS. 4A and 4B show the spectral characteristics when the third optical element 11 is inserted and when the third optical element 11 is not inserted, respectively. By the third optical element 11 being thus inserted into the irradiating optical path and the light of 570 nm–600 nm being cut, color purity can be improved. Generally, however, when the light reducing its color purity is intercepted, color purity is improved, but the quantity of light is reduced. In the case of the above-described third optical element 11, the cut band and transmittance are set so that color purity and color balance can be secured without the quantity of light being greatly reduced.

Figure 5:
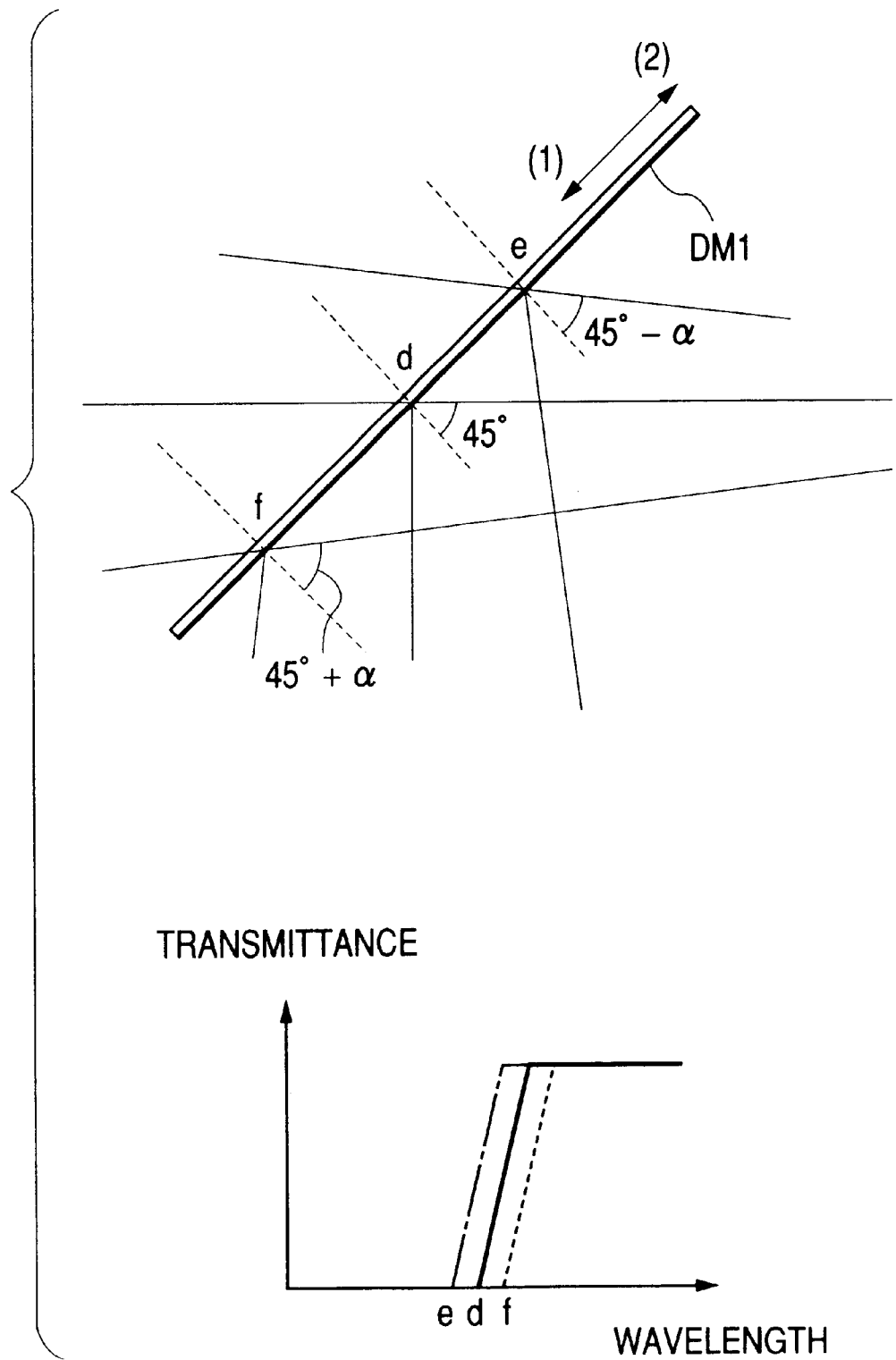
FIG. 5 shows the optical paths of lights irradiating the central portion and peripheral portion of a liquid crystal display portion in Embodiment 1 near a dichroic mirror DM1 and the inclination correction characteristic of the dichroic mirror DM1.

Description will now be made of the movement of the movable dichroic mirror DM1 subjected to inclination correction. FIG. 5, shows the inclination correction characteristic of the movable dichroic mirror DM1 of FIG. 1. This shows the wavelength spectral characteristic at an angle of incidence of 45° at each point.

Figure 6A:
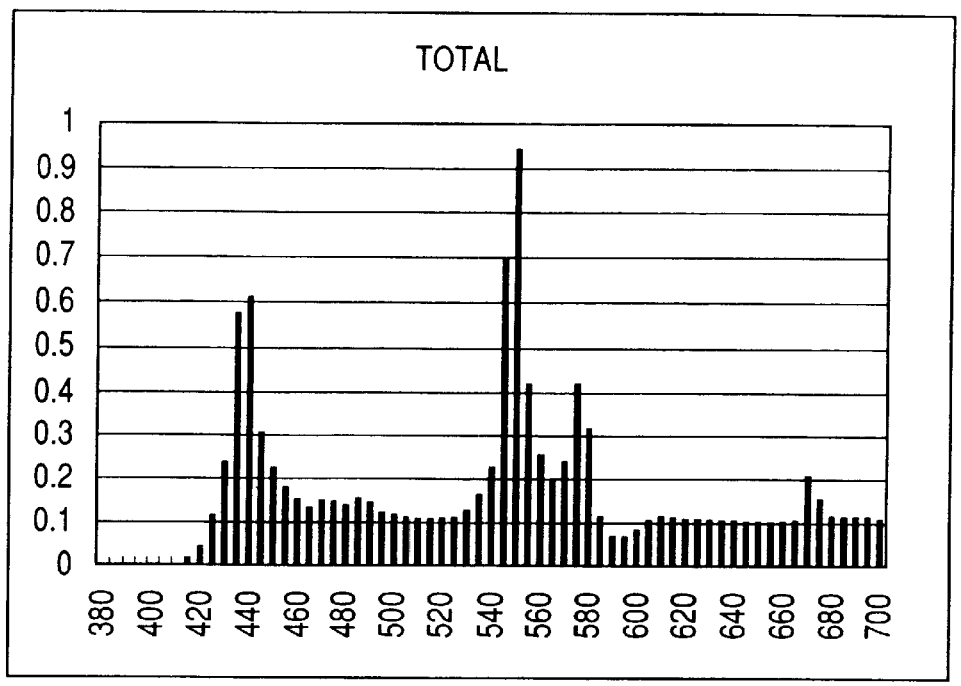
FIGS. 6A and 6B show the spectral distributions when the cut wavelength of the dichroic mirror DM1 in Embodiment 1 has become 580 nm.
Figure 6B:
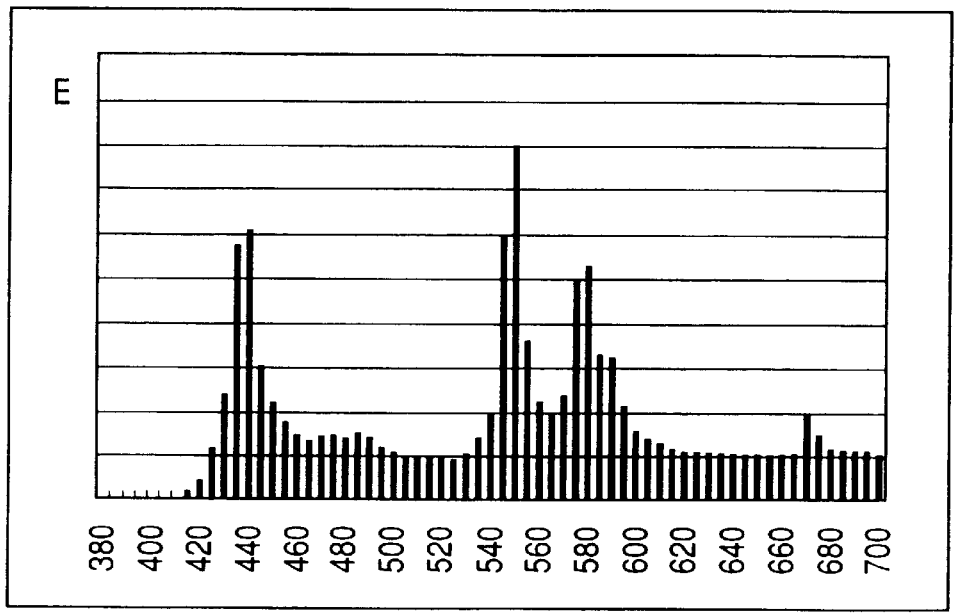

Now, the cut wavelength on the central portion of this dichroic mirror DM1 is set to 570 nm, and the spectral characteristic during the insertion of the third optical element 11 and during the non-insertion of the third optical element 11 when the cut wavelength has become 580 nm due to a manufacturing error are shown in FIGS. 6A and 6B.

Comparing FIGS. 6A and 6B with FIGS. 4A and 4B, when priority is given to brightness (when the third optical element 11 for changing color purity is not inserted), they are equal in spectral distribution and brightness to each other, but when importance is attached to color reproducibility (when the third optical element 11 is inserted), light of 570 nm–580 nm is used and becomes bright. At the same time, color reproducibility becomes bad.

Figure 7A:
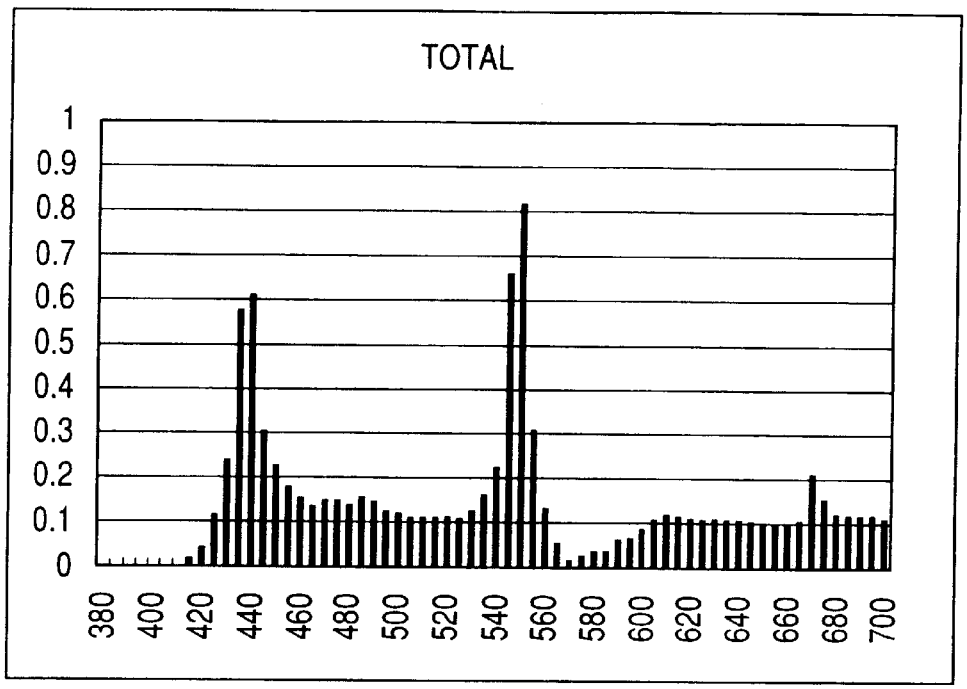
FIGS. 7A and 7B show the spectral distributions when the cut wavelength of the dichroic mirror DM1 in Embodiment 1 has become 560 nm.
Figure 7B:
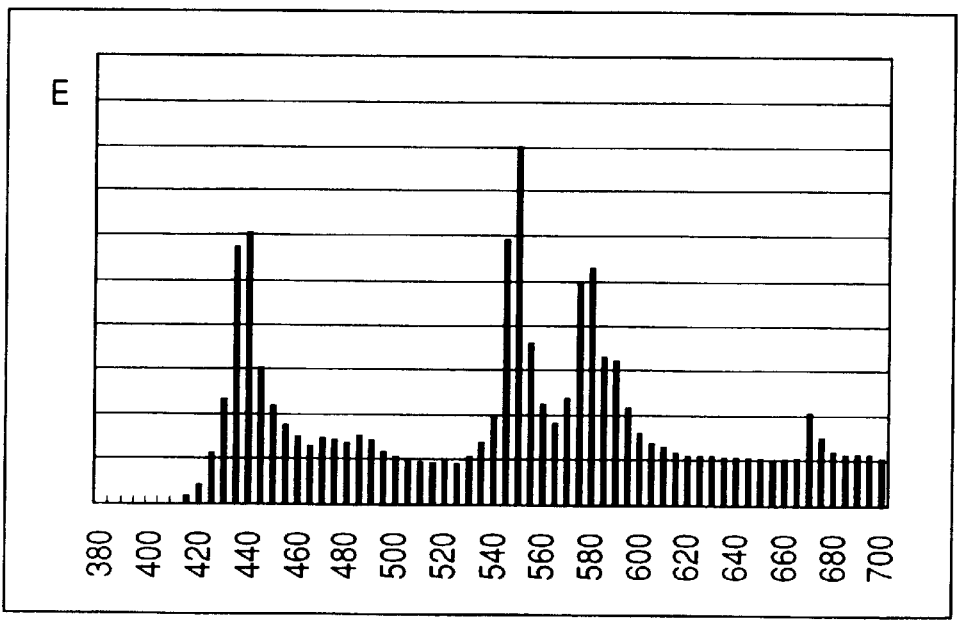

Conversely, when the cut wavelength on the central portion of the dichroic mirror DM1 subjected to inclination correction has become 560 nm, the up rate of brightness in case of display giving priority to brightness increases, but in case of display attaching importance to color reproducibility (when the third optical element 11 is inserted), light of 560 nm–570 nm is not used and becomes dark. The spectral distributions at this time are shown in FIGS. 7A and 7B.

Description will now be made of a method of correcting such unevenness of brightness caused by the unevenness of the cut wavelength to the on-axis ray due to the manufacturing error.

Figure 8:
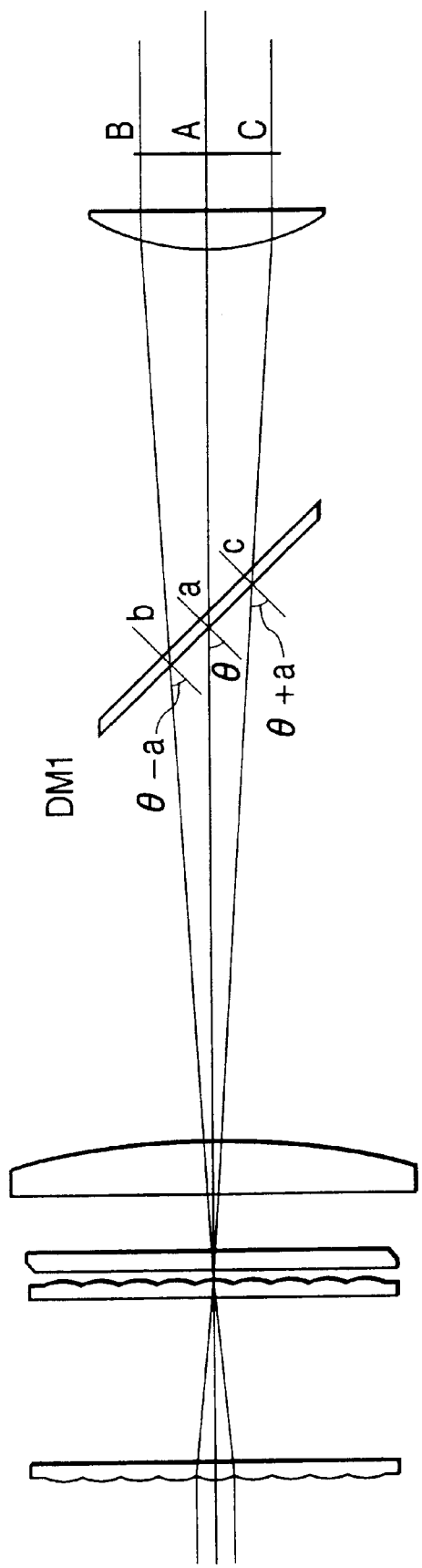
FIG. 8 shows the optical paths of lights irradiating the central portion and peripheral portion of an ordinary liquid crystal display portion.

FIG. 8 shows the optical paths of the principal rays illuminating the central portion and peripheral portions of the liquid crystal display element 8. In FIG. 8, reference sign "a" indicates a position at which the principal ray of light irradiating the central portion A of the liquid crystal display element 8 is transmitted through the dichroic mirror DM1, and reference signs "b" and "c" indicate positions at which the principal rays of light respectively irradiating the peripheral portions B and C of the liquid crystal display element are transmitted through the dichroic mirror DM1.

Assuming that the light ("a" in FIG. 8) transmitted through the dichroic mirror DM1 and irradiating the central portion of the liquid crystal display element is incident on the dichroic mirror at an angle θ, the light ("b" in FIG. 8) irradiating an end portion of the liquid crystal display element is incident on the dichroic mirror at an angle θ−α(α>0) and the light ("c" in FIG. 8) irradiating an end opposite portion to the former "b" is incident on the dichroic mirror at angle θ+α.

Figure 9:
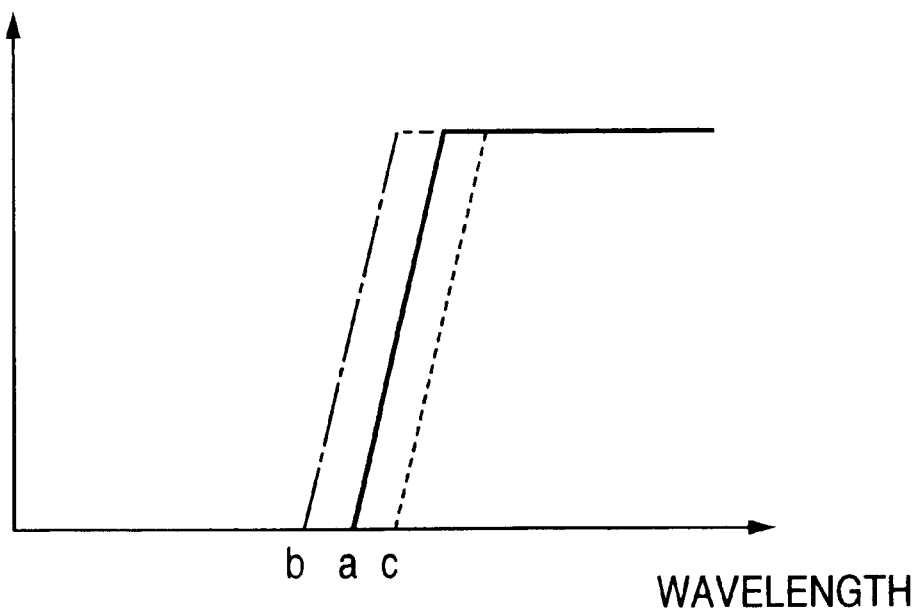
FIG. 9 shows the inclination correction characteristic of the dichroic mirror.

The dichroic mirror DM1 is a mirror transmitting the red wavelength region therethrough and reflecting the wavelength regions of the remaining colors, and describing on the assumption that the cut wavelength at the point a is 570 nm, if the mirror DM1 is not subjected to inclination correction and the cut wavelength of the dichroic mirror is generally uniform, at the point c, the cut wavelength comes toward the short wavelength side because the angle of incidence is greater at the point c than at the point a, and conversely at the point b, the cut wavelength comes toward the long wavelength side, and this is intactly projected as color unevenness onto the screen. In order to eliminate this color unevenness, dielectric material multilayer film on which the angle of incidence of a ray varies along the direction of inclination thereof is provided on the dichroic mirror with the film thickness thereof varied in conformity with the amount of correction of the cut wavelength to thereby provide "a dichroic mirror subjected to inclination correction", and as shown in FIG. 9, the cut wavelength is shifted to the cut wavelength at each point at the angle of incidence θ of the light at the point a, whereby the difference between the cut wavelengths due to the difference in the angle of incidence is absorbed, and correction is effected so that a red projected image may be obtained at each position on the screen.

By the utilization of the inclination correction to this multilayer film, when due to the manufacturing error of the dichroic mirror, the cut wavelength of the central portion comes more toward the long wavelength side than the design value, the mirror is moved toward the direction (1) in FIG. 5 so that a point nearer to e may become the center of the optical axis. Conversely, when the cut wavelength of the central portion comes more toward the short wavelength side than the design value, the mirror is moved toward the direction (2) in FIG. 5 so that a point nearer to f may become the center of the optical axis.

By thus approximating the cut wavelength for the on-axis ray (the ray propagating on the optical axis) to the design value, it becomes possible to prevent the unevenness of the quantity of light during the display giving priority to color reproducibility, and also correct the unevenness of the up rate of the brightness in the display giving priority to brightness to the brightness in the display attaching importance to color reproducibility. It should be noted that the movement of the movable dichroic mirror subjected to inclination correction and the third optical element 11 for changing the color purity can be manually accomplished or can be accomplished by a combination of a motive power generator and a motive power transmitter.

Also, the present invention covers a projection type display apparatus free of the third optical element 11 and having in a color resolving system a movable dichroic mirror subjected to inclination correction.

(Embodiment 2)

Figure 10:
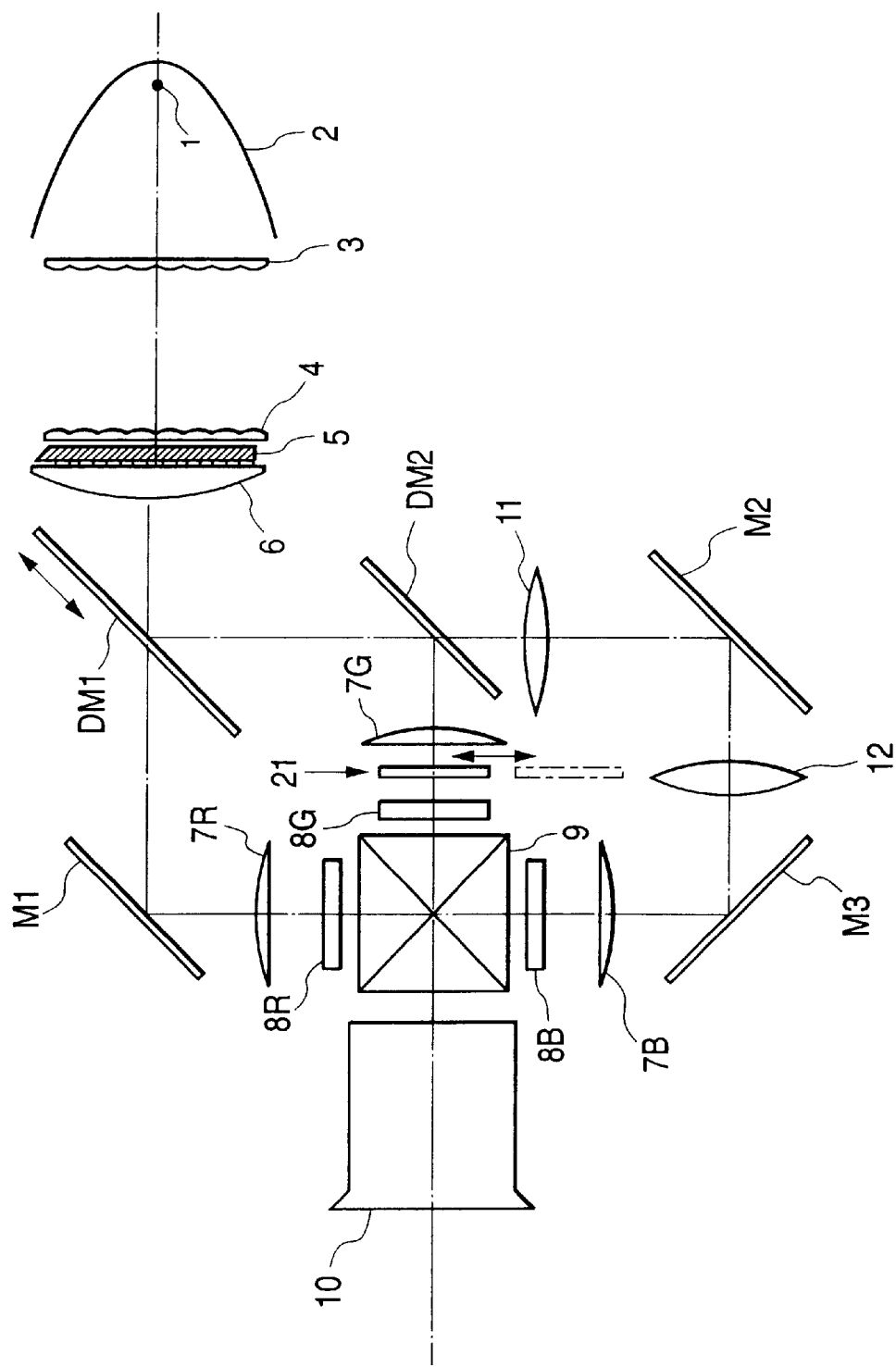
FIG. 10 shows the construction of Embodiment 2 of the present invention.

FIG. 10 shows the detailed construction of Embodiment 2 of the present invention.

Figure 11:
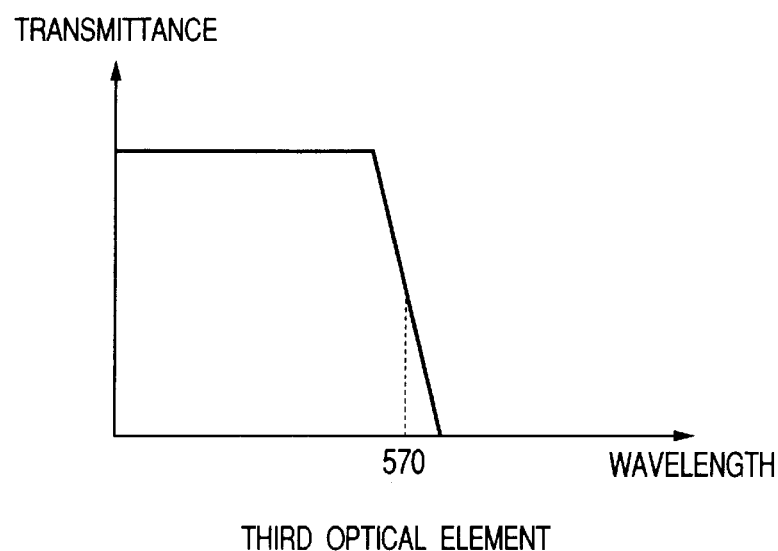
FIG. 11 shows the wavelength spectral characteristic of a third optical element in Embodiment 2 of the present invention.
Figure 12A:
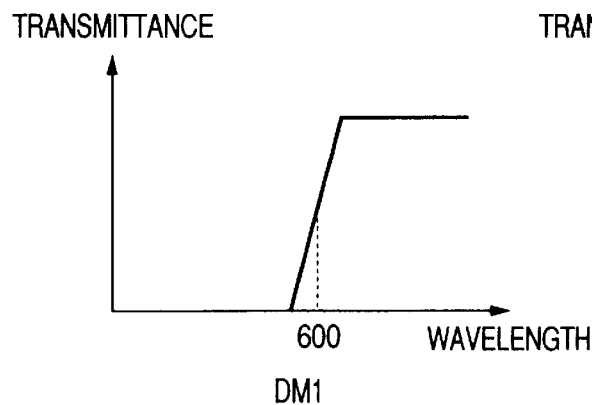
FIGS. 12A and 12B show the wavelength spectral characteristics of dichroic mirrors in Embodiment 2 of the present invention.
Figure 12B:
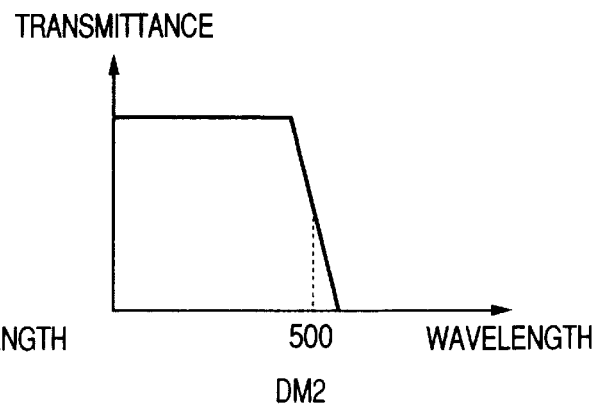

This embodiment is one in which the wavelength spectral characteristic of the movable dichroic mirror DM1 subjected to inclination correction in the color resolving system in Embodiment 1 has been changed as shown in FIG. 12A, whereby a third optical element 21 for changing color purity is installed immediately before a liquid crystal display element of the green wavelength band. The third optical element 21 may be disposed anywhere between the dichroic mirror DM1 subjected to inclination correction and the liquid crystal display element of the green wavelength band. The insertion and retraction of this third optical element 21 are similar to those in Embodiment 1 and therefore need not be described. FIG. 11 shows the spectral transmittance of the third optical element 21 used in Embodiment 2, and FIGS. 12A and 12B show the spectral transmittances of the central portions of the dichroic mirrors DM1 and DM2, respectively. The third optical element 21 is an edge filter.

Description will now be made of the movement of the dichroic mirror DM1 subjected to inclination correction.

Figure 13:
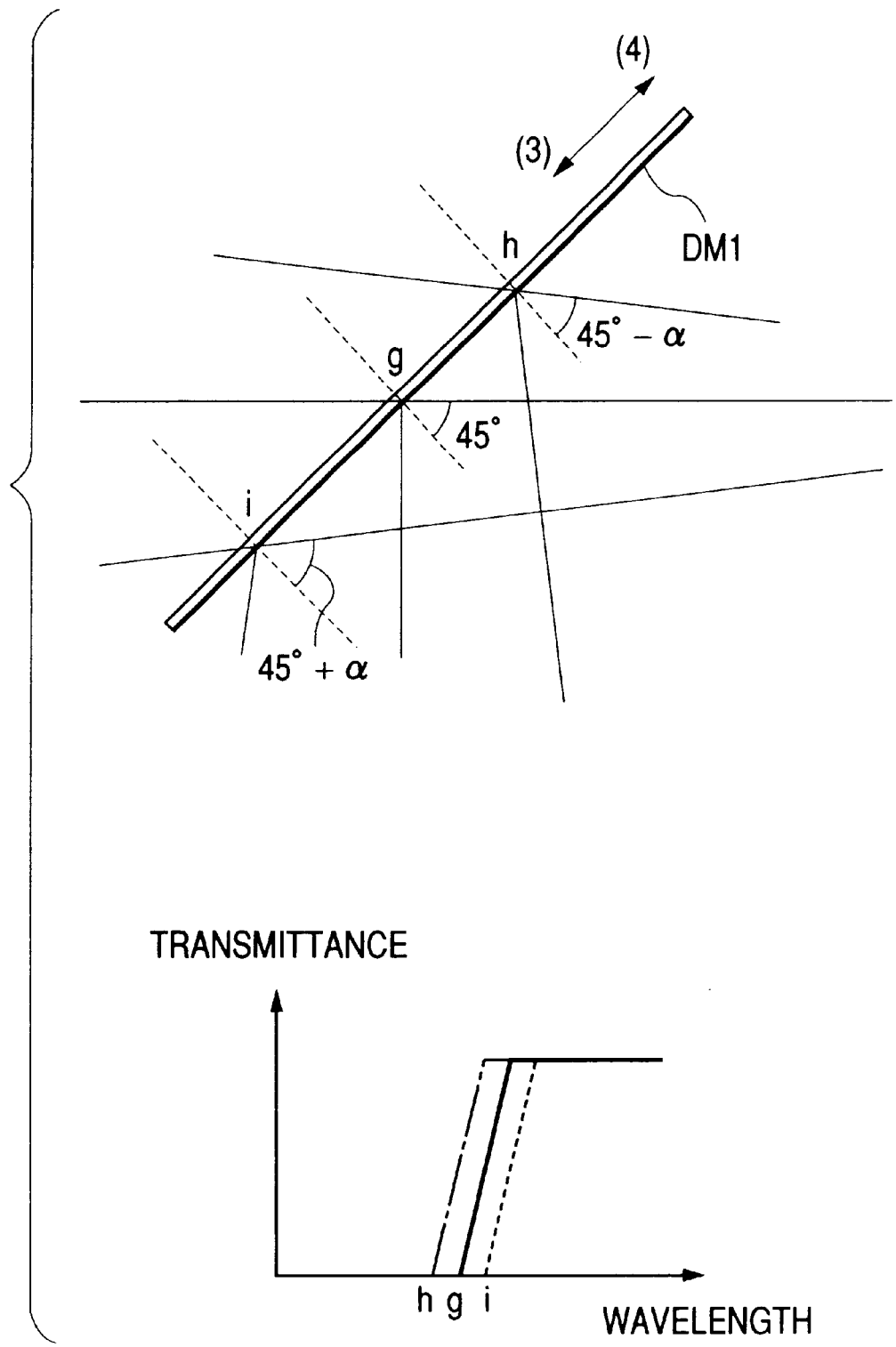
FIG. 13 shows the optical paths of lights irradiating the central portion and peripheral portion of a liquid crystal display portion in Embodiment 2 near a dichroic mirror DM1 and the inclination correction characteristic of the dichroic mirror DM1.

FIG. 13 shows the inclination correction characteristic of the movable dichroic mirror DM1 of FIG. 10. This shows the wavelength spectral characteristic at an angle of incidence of 45° at each point.

Figure 14A:
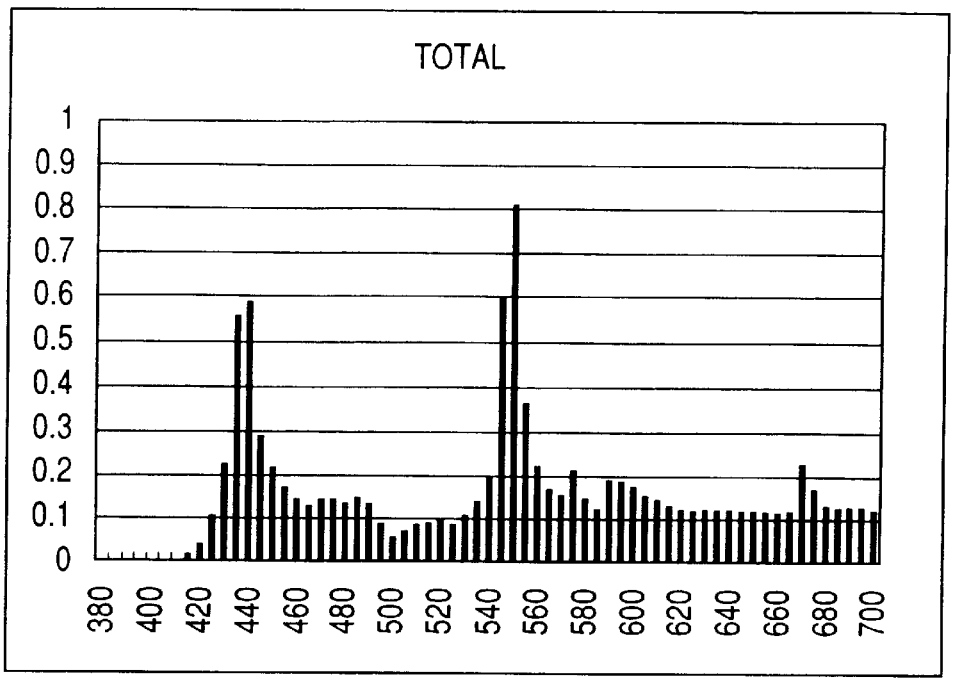
FIGS. 14A and 14B show the spectral distributions when the cut wavelength of the dichroic mirror DM1 in Embodiment 2 has become 590 nm.
Figure 14B:
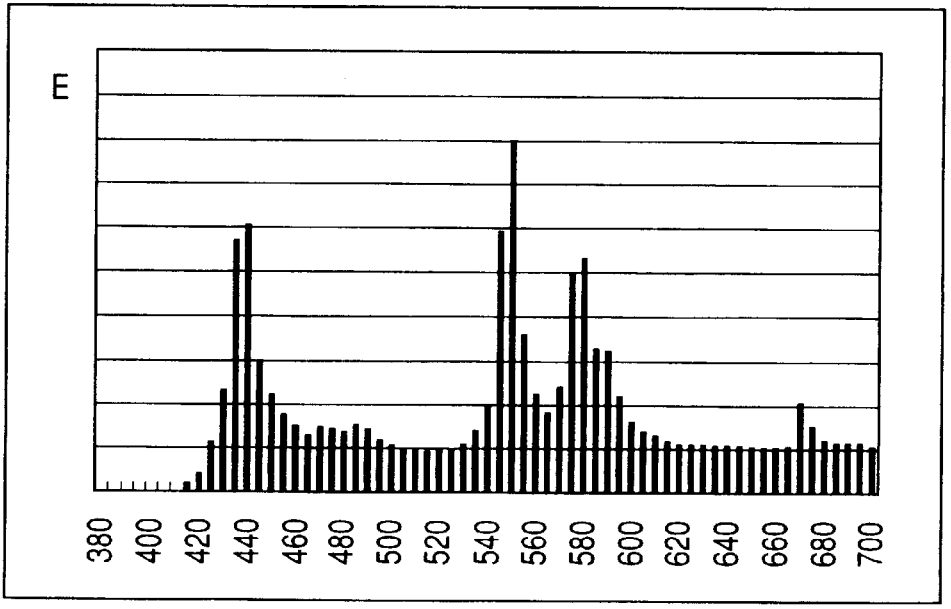

Now, the cut wavelength on the central portion of the movable dichroic mirror DM1 is set to 600 nm, and the spectral characteristic during the insertion of the third optical element 21 for changing color purity and during the non-insertion thereof when this cut wavelength has become 590 nm due to a manufacturing error are shown in FIGS. 14A and 14B, respectively.

Comparing FIGS. 14A and 14B with FIGS. 4A and 4B, when priority is given to brightness (when the third optical element 21 for changing color purity is not inserted), they are equal in spectral distribution and brightness to each other, but when importance is attached to color reproducibility (when the third optical element 21 is inserted), light of 590 nm–600 nm is used and becomes bright. At the same time, color reproducibility becomes bad.

Figure 15A:
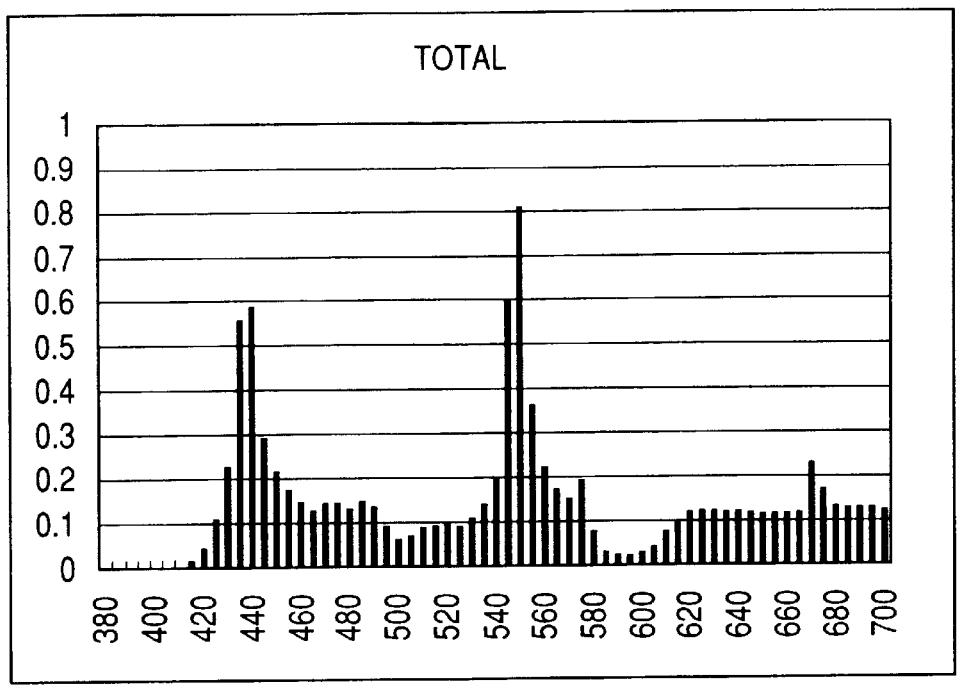
FIGS. 15A and 15B show the spectral distribution when the cut wavelength of the dichroic mirror DM1 in Embodiment 2 has become 610 nm.
Figure 15B:
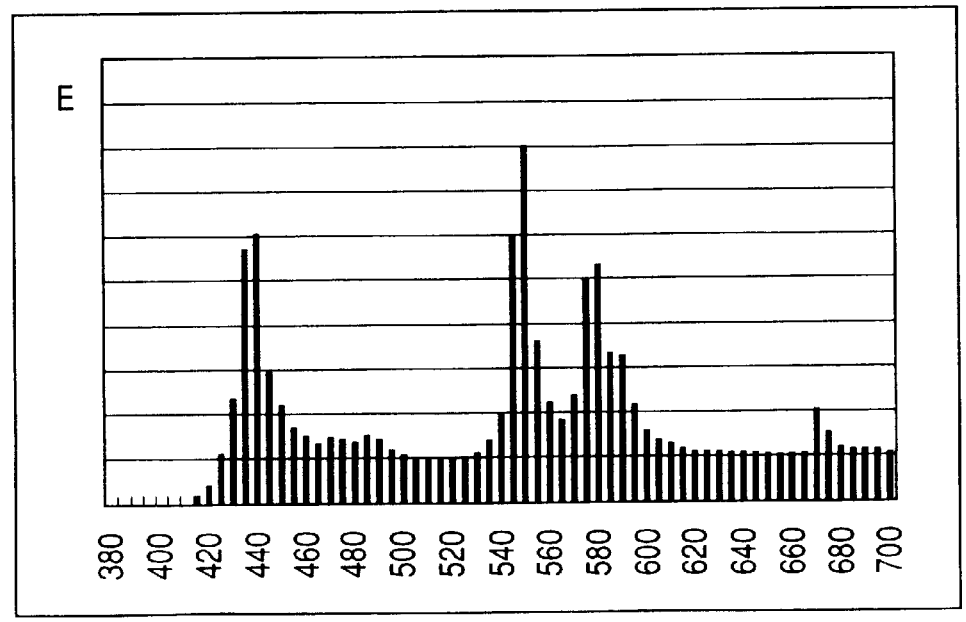

FIGS. 15A and 15B show the spectral distributions when conversely the cut wavelength on the central portion of the dichroic mirror DM1 subjected to inclination correction has become 610 nm. At this time, the up rate of the brightness during the display giving priority to brightness increases, but in the display attaching importance to color reproducibility (when the third optical element 21 is inserted), light of 600 nm–610 nm is not used and therefore becomes dark.

So, when due to a manufacturing error, the cut wavelength on the central portion of the dichroic mirror DM1 subjected to inclination correction comes more toward the long wavelength side than the design value, the mirror is moved toward the direction (3) in FIG. 13 along the direction in which it is inclined so that a point nearer to h in FIG. 13 may become the center of the optical axis. Conversely, when the cut wavelength on the central portion of the dichroic mirror DM1 subjected to inclination correction comes more toward the short wavelength side than the design value, the mirror is moved toward the direction (4) in FIG. 13 along the direction in which it is inclined so that a point nearer to i in FIG. 13 may become the center of the optical axis.

In this manner, the cut wavelength for the on-axis ray is approximated to the design value, whereby it is possible to prevent a reduction in the quantity of light during the display attaching importance to color reproducibility, and also prevent the deterioration of color reproducibility.

It should be noted that the movement of the movable dichroic mirror subjected to inclination correction and the third optical element 21 for changing color purity can be manually accomplished or can be accomplished by a combination of a motive power generator and a motive power transmitter.

Also, the present invention covers a projection type display apparatus free of the third optical element 21 and having in a color resolving system a movable dichroic mirror subjected to inclination correction.

(Embodiment 3)

Figure 16:
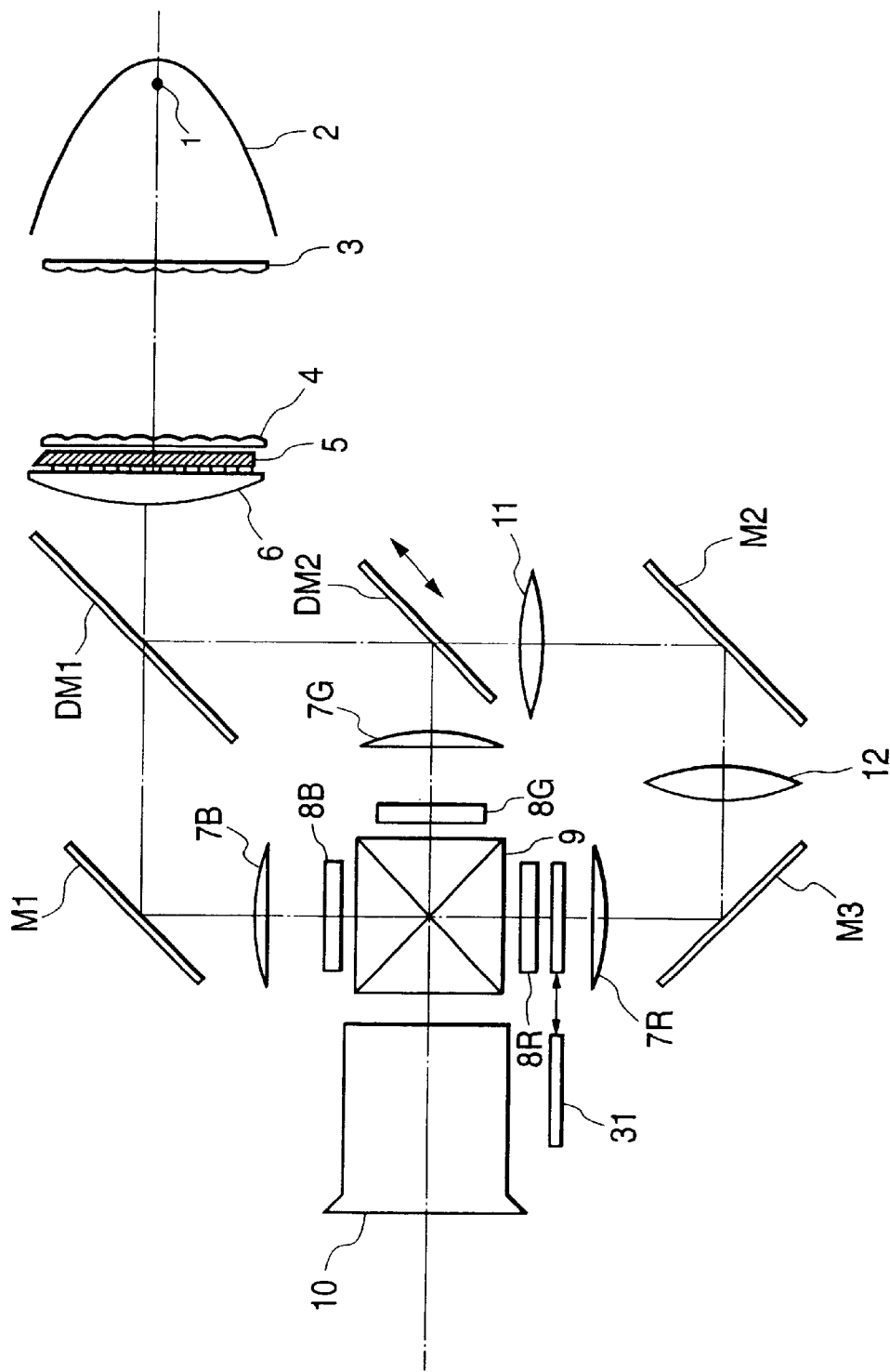
FIG. 16 shows the construction of Embodiment 3 of the present invention.
Figure 17:
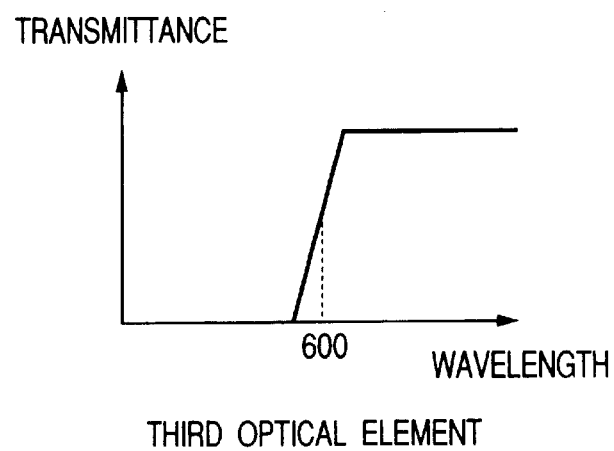
FIG. 17 shows the wavelength spectral characteristic of a third optical element in Embodiment 3 of the present invention.
Figure 18A:
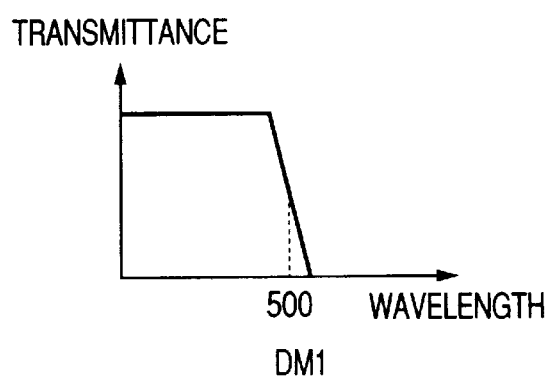
FIGS. 18A and 18B show the wavelength spectral characteristics of dichroic mirrors in Embodiment 3 of the present invention.
Figure 18B:
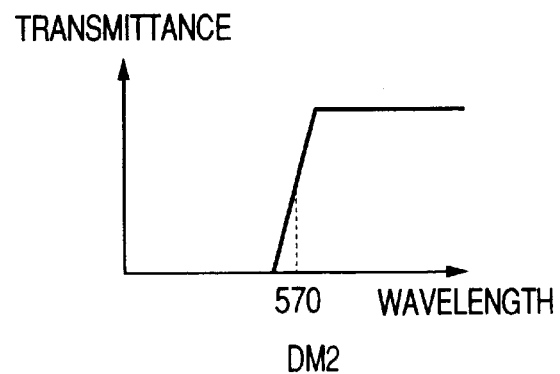
Figure 19:
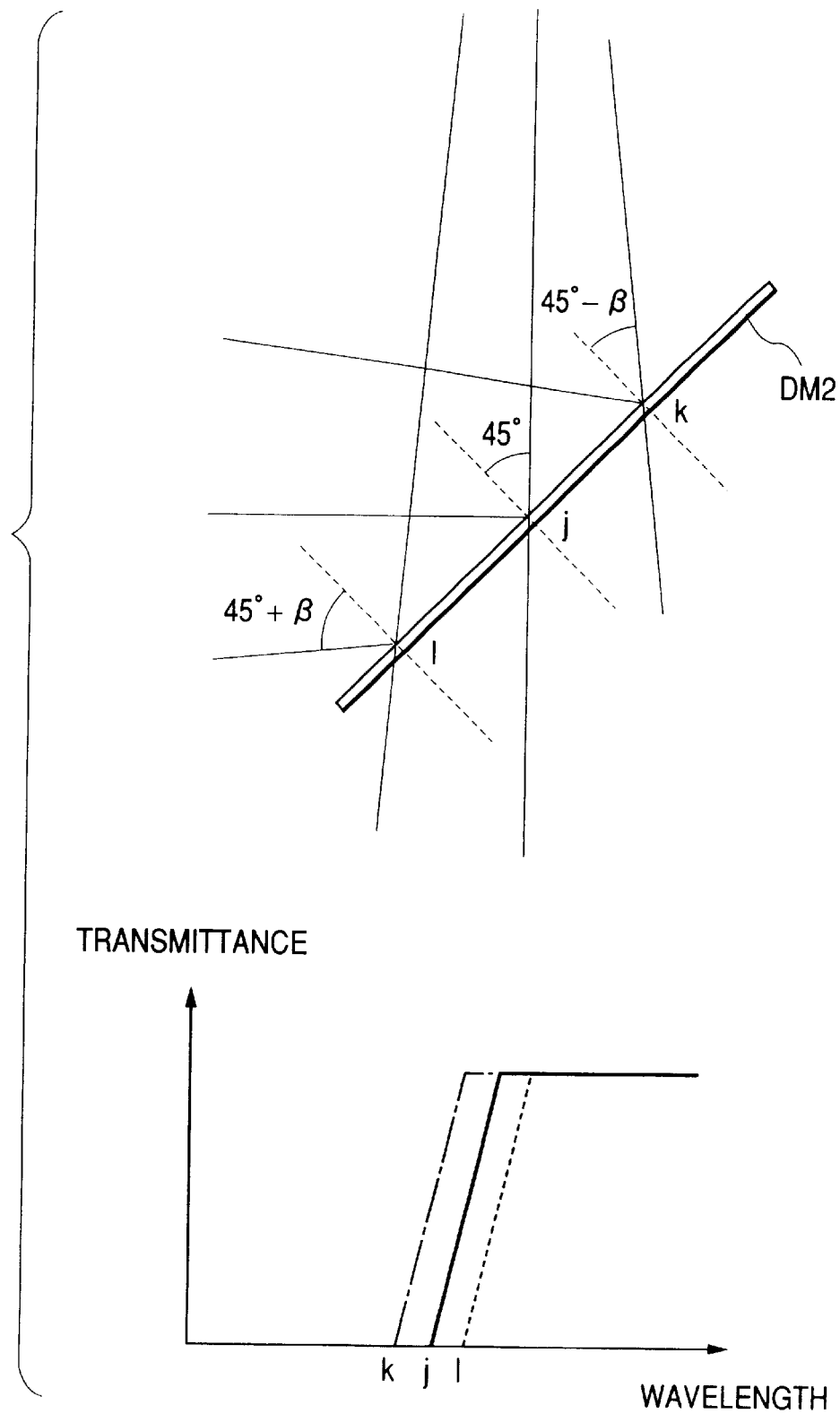
FIG. 19 shows the optical paths of lights irradiating the central portion and peripheral portion of a liquid crystal display portion in Embodiment 3 near a dichroic mirror DM2 and the inclination correction characteristic of the dichroic mirror DM2.

FIG. 16 shows the detailed construction of Embodiment 3 of the present invention. Also, FIG. 17 shows the spectral transmittance of a third optical element 31 for changing color purity used in Embodiment 3, and FIGS. 18A and 18B show the spectral transmittances of the central portions of a dichroic mirror DM1 and a dichroic mirror DM2. FIG. 19 represents the inclination correction characteristic of the dichroic mirror DM2 in the present embodiment. The third optical element 31 is an edge filter.

Embodiment 3 is one in which the optical paths of the red wavelength band and the blue wavelength band in Embodiment 1 are reversed and the dichroic mirror DM2 is a movable mirror subjected to inclination correction. The insertion and retraction of the third optical element 31 for changing color purity and the movement of the dichroic mirror DM2 subjected to inclination correction are similar to those in Embodiment 1 and therefore need not be described.

The inclination correction and the movement in the inclined direction of the dichroic mirror DM2 are not restricted to those of the dichroic mirror for the separation of green and red as in Embodiment 3, but similar inclination correction and movement in the inclined direction may be executed on the dichroic mirror DM1 for the separation of green and red or blue. The spectral wavelength characteristics of the dichroic mirrors DM are not restricted to these, and a plurality of third optical elements 31 for changing color purity may be used in conformity with these characteristics. The directions of operation (the directions of movement) of the third optical element in case of the insertion and retraction thereof are not restricted to these.

It should be noted that the movement of the movable dichroic mirror subjected to inclination correction and the third optical element 31 for changing color purity can be manually accomplished or can be accomplished by a combination of a motive power generator and a motive power transmitter.

Also, the present invention covers a projection type display apparatus free of the third optical element 31 and having in a color resolving system a movable dichroic mirror subjected to inclination correction.

(Embodiment 4)

Figure 20:
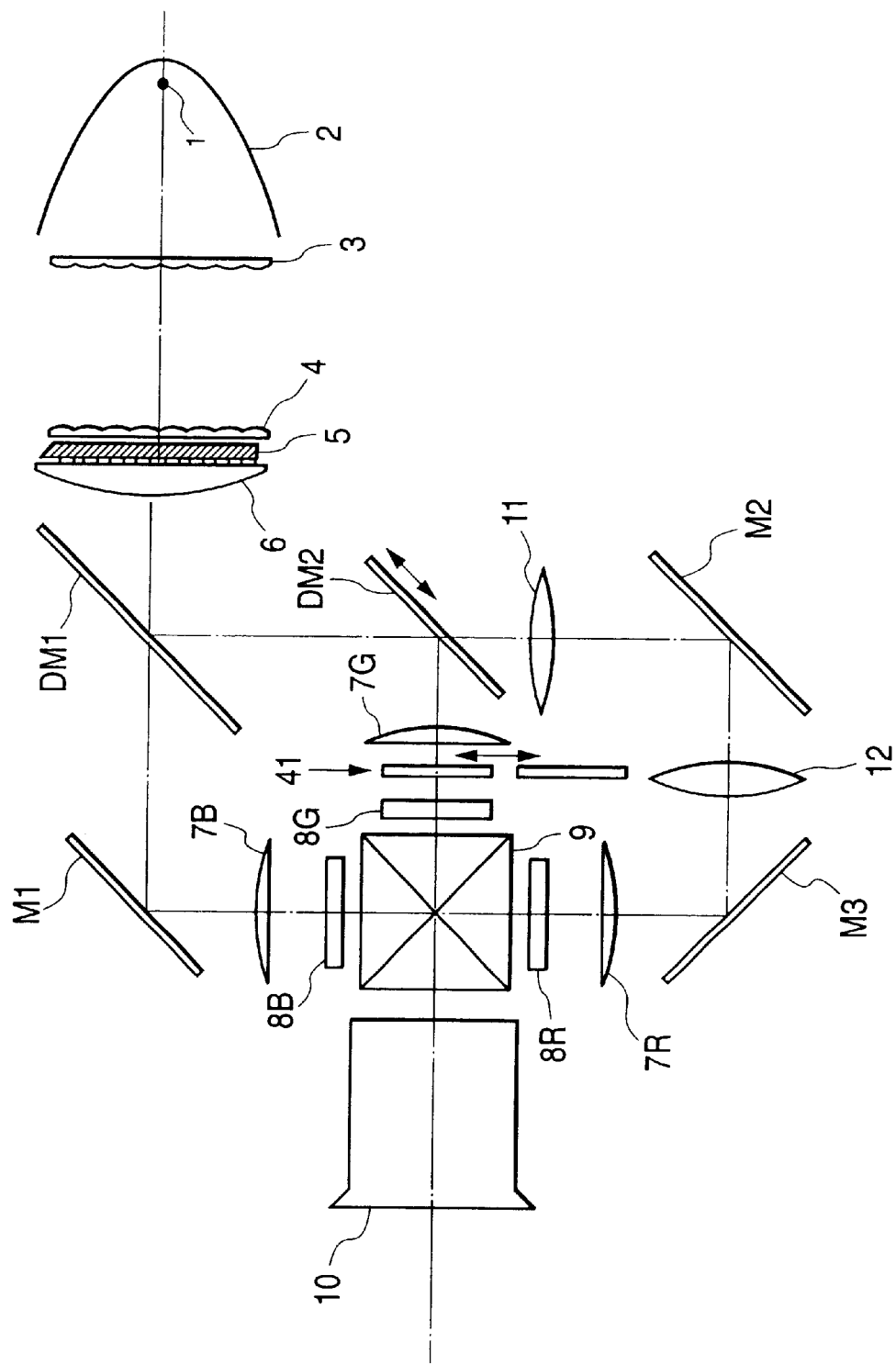
FIG. 20 shows the construction of Embodiment 4 of the present invention.
Figure 21:
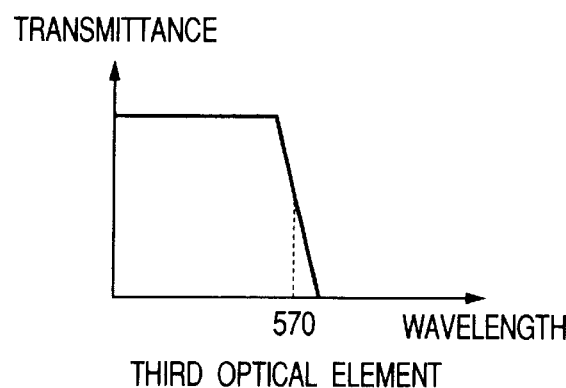
FIG. 21 shows the wavelength spectral characteristic of a third optical element in Embodiment 4 of the present invention.
Figure 22A:
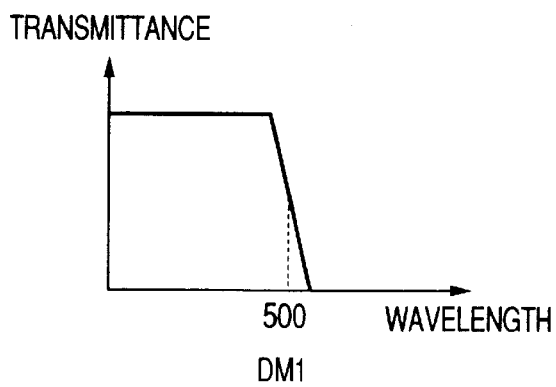
FIGS. 22A and 22B show the wavelength spectral characteristics of dichroic mirrors in Embodiment 4 of the present invention.
Figure 22B:
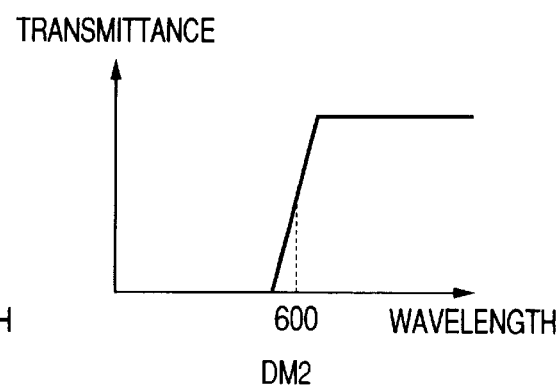
Figure 23:
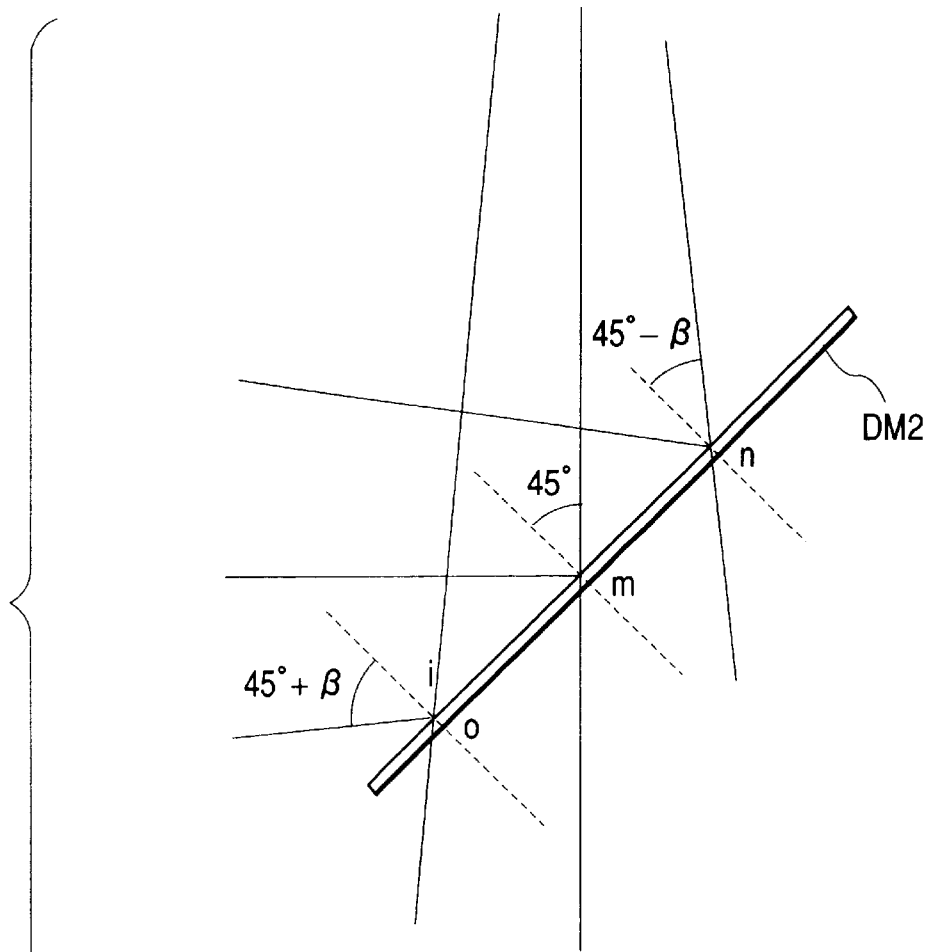
FIG. 23 shows the optical paths of lights irradiating the central portion and peripheral portion of a liquid crystal display portion in Embodiment 4 near a dichroic mirror DM2 and the inclination correction characteristic of the dichroic mirror DM2.
Figure 23:
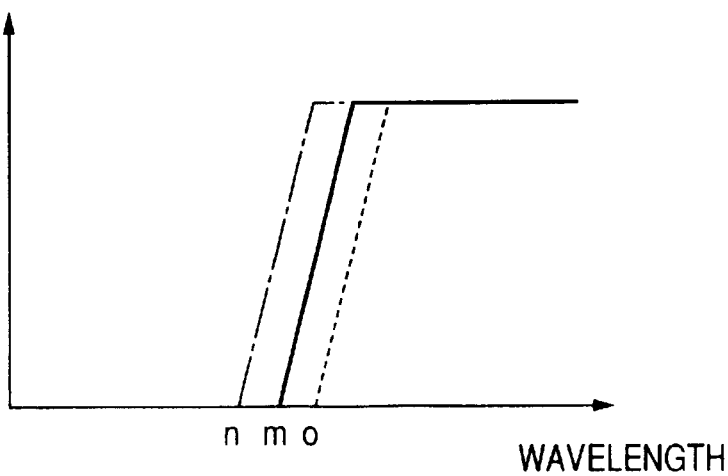
Figure 24:
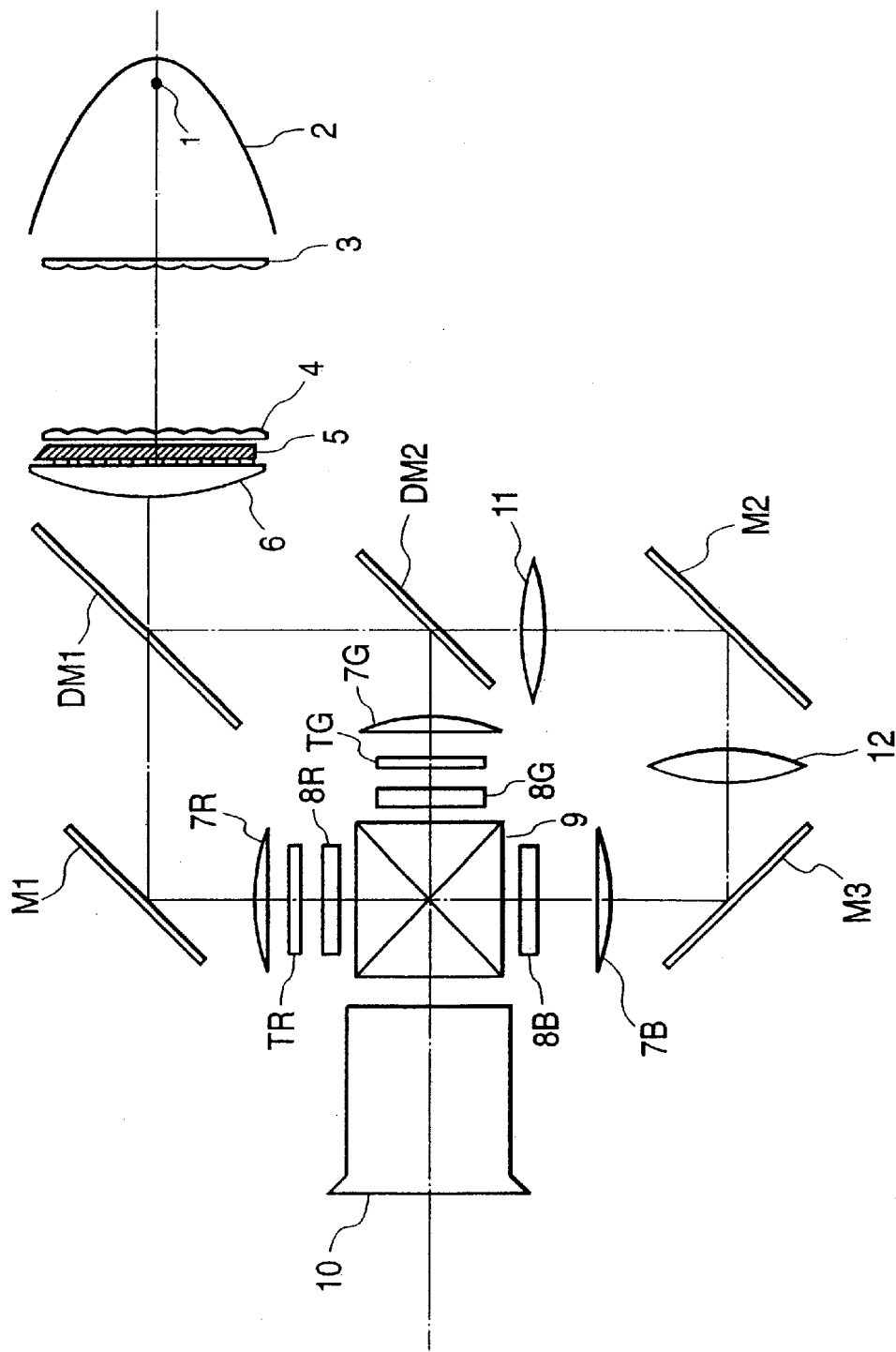
FIG. 24 shows the construction of a projection type display apparatus according to the prior art.
Figure 25A:
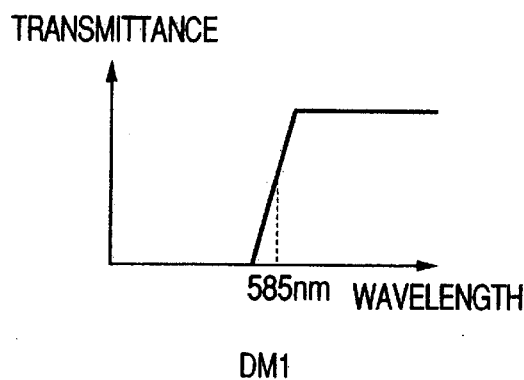
FIGS. 25A, 25B, 25C and 25D show the wavelength spectral characteristics of the dichroic mirrors and trimming filters of the projection type display apparatus according to the prior art.
Figure 25B:
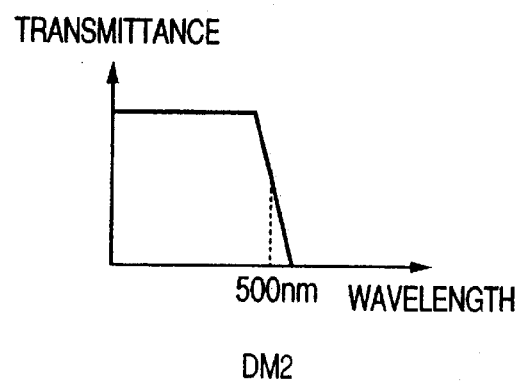
Figure 25C:
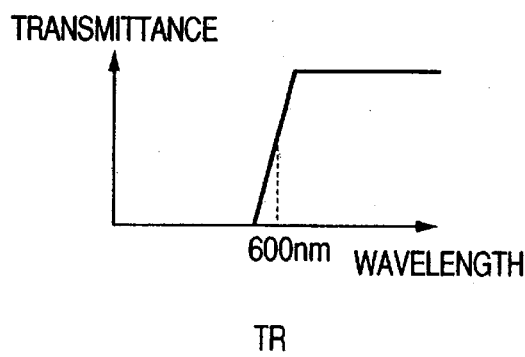
Figure 25D:
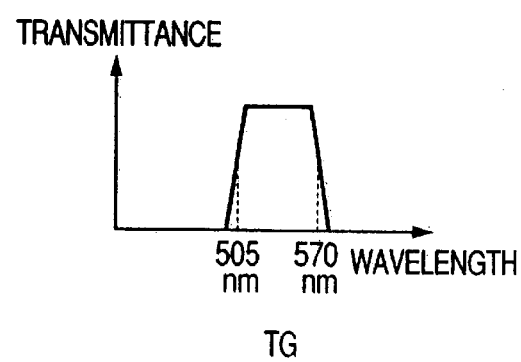

FIG. 20 shows the detailed construction of Embodiment 4 of the present invention. Also, FIG. 21 shows the spectral transmittance of a third optical element 41 used in Embodiment 4, and FIGS. 22A and 22B show the spectral transmittances of the central portions of a dichroic mirror DM1 and a dichroic mirror DM2, respectively. FIG. 23 represents the inclination correction characteristic of the movable dichroic mirror DM2 subjected to inclination correction in the present embodiment. The third optical element 41 is an edge filter.

The present embodiment is one in which the optical paths of the red wavelength band and blue wavelength band in Embodiment 2 are reversed. The insertion and retraction of the third optical element 41 for changing color purity and the movement of the dichroic mirror DM2 subjected to inclination correction are similar to those in Embodiment 2 and therefore need not be described.

The inclination correction and movement in the inclined direction of the dichroic mirror DM2 are not restricted to those of the dichroic mirror 2 for the separation of green and red as in Embodiment 4, but similar inclination correction and movement in the inclined direction may be executed on the dichroic mirror DM1 for the separation of green and red or blue.

The spectral wavelength characteristic of the dichroic mirror DM1 is not restricted to these, and a plurality of third optical elements 41 for changing color purity may be used in conformity with these characteristics. Also, the direction of operation (the direction of movement) of the third optical element during the insertion and retraction thereof is not restricted to these.

It should be noted that the movement of the dichroic mirror DM2 subjected to inclination correction and the third optical element 41 for correcting color purity can be manually accomplished or can be accomplished by a combination of a motive power generator and a motive power transmitter. Also, the present invention covers a projection type display apparatus free of the third optical element 41 and having in a color resolving system a movable dichroic mirror subjected to inclination correction.

Not only the above-described Embodiments 1 and 4 but various forms are conceivable as the embodiments of the present invention. Both of the two dichroic mirrors the color separating optical system used in the present invention has may be subjected to inclination correction, and both of the two dichroic mirrors may be movable. Also, the dichroic mirror subjected to inclination correction or the movable dichroic mirror may be either of the two dichroic mirrors. Further, the third optical element can be appropriately disposed in the optical path of R color and/or the optical path of G color and/or the optical path of B color depending on the kind of the light source, and the position at which the third optical element is disposed is not restricted to that in the present embodiment.

While the display apparatus described above uses a liquid crystal panel as the display element, the display element used in the present invention is not limited to the liquid crystal type, but use can be made of a reflection type display element comprising pivotally movable micro mirrors or deformed or deformable micro mirrors arranged one-dimensionally or two-dimensionally. When such reflection type display element is used, the optical system differs from that of each above-described embodiment, but it need not be described herein. Also, as the color combining optical system, use is made of not the shown cross dichroic prism, but a plurality of dichroic prisms of other type or dichroic mirrors arranged in parallel to one another. Also, corresponding color lights are not made to enter display elements of respective colors R, G and B, but lights of respective colors R, G and B may be made to enter a liquid crystal panel with a microlens array having groups of pixels for respective colors R, G and B set therein from different directions. In this case, the color combining system is unnecessary. Also, instead of the edge filter, a band cut filter can be used as the third optical element for changing color purity.

What is claimed is:

1. A display apparatus comprising:
   a color separating optical system for separating light from a light source into a plurality of lights differing in color from one another; and
   at least one display element for modulating the plurality of lights differing in color from one another;
   the color separating optical system including at least one color separating surface subjected to inclination correction, said color separating surface subjected to inclination correction being movable,
   wherein the inclination correction of the color separating surface effects preventing a cut wavelength from being varied by the difference in the angle of incidence of the light onto the color separating surface.

2. A display apparatus according to claim 1, wherein said color separating surface subjected to inclination correction is movable in a direction parallel to itself.

3. A display apparatus according to claim 1, wherein said color separating optical system has a plurality of color separating surfaces.

4. A display apparatus according to claim 1, wherein said plurality of lights differing in color from one another include at least red, green and blue lights.

5. A display apparatus according to claim 1, wherein said color separating surface comprises a surface of a dichroic mirror.

6. A display apparatus according to claim 1, wherein said display element has a light combining optical system for combining lights from a plurality of display elements disposed correspondingly to said plurality of lights differing in color from one another for modulating said plurality of lights.

7. A display apparatus according to claim 6, wherein said light combining optical system has three or more prisms.

8. A display apparatus according to claim 7, wherein said light combining optical system is constructed such that four prisms are cemented together by an adhesive agent and wavelength selection reflecting layers assume a substantially cruciate shape.

9. A display apparatus according to claim 1, including means for causing an image to be displayed in a plurality of different kinds of display forms by changing the color purity of at least one of said plurality of lights differing in color from one another.

10. A display apparatus according to claim 9, wherein said means for causing an image to be displayed in a plurality of different kinds of display forms changes the color purity of said at least one light by putting an optical element into or out of the optical path of said at least one light color, or changing the posture of an optical element disposed in said optical path.

11. A display apparatus according to claim 10, wherein said optical element is disposed between said color separating optical system and said display element.

12. A display apparatus according to claim 10, wherein said optical element is an edge filter.

13. A projection type display apparatus comprising:
    a display apparatus according to claim 1; and
    a projection optical system for projecting the light from said at least one display element.

14. A projection type display apparatus comprising:
    a plurality of image display elements;
    a color separating optical system for color-separating light from a light source into a plurality of color lights;
    an irradiating optical system for irradiating said plurality of image display elements with the lights from said color separating optical system;
    a color combining optical system for combining the lights from said plurality of image display elements; and
    a projection optical system for projecting the lights combined by said color combining optical system onto a projection surface;
    said projection type display apparatus having on the optical path of at least one of said plurality of color lights an optical element having the characteristic of transmitting therethrough a region of a predetermined wavelength or longer in a visible light region but blocking a region of wavelengths shorter than said predetermined wavelength or a converse characteristic;
    said color separating optical system having at least one color separating surface subjected to inclination correction, said color separating surface being movable,
    wherein the inclination correction of the color separating surface effects preventing a cut wavelength from being varied by the difference in the angle of incidence of the light onto the color separating surface.

15. A projection type display apparatus according to claim 14, wherein said color separating surface subjected to inclination correction is movable in a direction parallel to itself.

16. A projection type display apparatus according to claim 14, wherein said color separating optical system has plurality of color separating surfaces.

17. A projection type display apparatus according to claim 14, wherein said plurality of color lights include at least red, green and blue lights.

18. A projection type display apparatus according to claim 14, wherein said color separating surface comprises a surface of a dichroic mirror.

19. A projection type display apparatus according to claim 14, wherein said display elements are disposed correspondingly to respective ones of said plurality of color lights, and have a light combining optical system for combining the lights from a plurality of display elements for modulating said plurality of lights.

20. A projection type display apparatus according to claim 19, wherein said light combining optical system has three or more prisms.

21. A projection type display apparatus according to claim 20, wherein said light combining optical system is constructed such that four prisms are cemented together by an adhesive agent and wavelength selection reflecting layers assume a substantially cruciate shape.

22. A projection type display apparatus according to claim 14, including means for causing an image to be displayed in a plurality of different kinds of display forms by changing the color purity of at least one of said plurality of lights differing in color from one another.

23. A projection type display apparatus according to claim 22, said means for causing an image to be displayed in a plurality of different kinds of display forms changes the color purity of said at least one light by putting an optical element into or out of the optical path of said at least one light color, or changing the posture of an optical element disposed in said optical path.

24. A projection type display apparatus according to claim 23, wherein said optical element is disposed between said color separating optical system and said display elements.

25. A projection type display apparatus according to claim 23, wherein said optical element is an edge filter.

26. A projection type display apparatus comprising:
    image display elements of three colors R, G and B;
    a color separating optical system for color-separating light from a light source into the three colors R, G and B;
    an irradiating optical system for guiding said color-resolved lights of the three colors R, G and B to the image display elements of the respective colors;
    a color combining optical system for combining the lights from said plurality of image display elements; and
    a projection optical system for projecting the lights combined by said color combining optical system onto a projection surface;
    said projection type display apparatus having in the optical path of the R color light and/or the optical path of the G color light an edge filter retractably insertable into the optical path and having the characteristic of transmitting therethrough a region of a predetermined wavelength or longer in a visible light region but blocking a region of wavelengths shorter than said predetermined wavelength, or a converse characteristic;
    said color separating optical system having two dichroic mirrors, one of said two dichroic mirrors which separates a light including the R color light and a light including the G color light from each other being subjected to inclination correction, said dichroic mirror subjected to inclination correction being movable in a direction parallel to a color separating surface said dichroic mirror has.

27. A display apparatus comprising:
    a color separating optical system for separating light from a light source into a plurality of lights differing in color from one another; and
    at least one display element for modulating the plurality of lights differing in color from one another,
    wherein the color separating optical system includes at least one color separating surface movable in a direction parallel to a direction along the color separating surface.

28. A display apparatus according to claim 27, wherein the direction parallel to the direction along the color separating surface is parallel to a color separating direction generated in said at least one color separating surface.

29. A display apparatus comprising:

a color separating optical system for separating light from a light source into a plurality of lights differing in color from one another; and at least one display element for modulating the plurality of lights differing in color from one another;

wherein said color separating optical system includes a movable color separating optical element having a color separating film provided with a posture in a predetermined angle inclined with regard to an optical axis of said light source, and wherein the color separating film effects an inclination correction to prevent a cut wavelength from being varied by the difference in the angle of incidence of the light onto the color separating film.

30. A display apparatus according to claim 29, wherein said movable color separating optical element is movable in a direction along the predetermined angle of said color separating film.

31. A projection type display apparatus comprising:

a display apparatus according to claim 30, and a projection optical system for projecting the light from said at least one display element.

* * * * *